(12) United States Patent
Kajiwara

(10) Patent No.: US 7,480,554 B2
(45) Date of Patent: Jan. 20, 2009

(54) MOTION STATE ESTIMATION APPARATUS FOR VEHICLE AND MOTION STATE CONTROL APPARATUS FOR VEHICLE

(75) Inventor: Koutarou Kajiwara, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 507 days.

(21) Appl. No.: 11/169,946

(22) Filed: Jun. 30, 2005

(65) Prior Publication Data

US 2006/0004508 A1 Jan. 5, 2006

(30) Foreign Application Priority Data

Jul. 2, 2004 (JP) ............................. 2004-196232

(51) Int. Cl.
*B60T 7/12* (2006.01)
(52) U.S. Cl. .......................................... 701/70; 701/71
(58) Field of Classification Search .................. 701/70, 701/72, 74, 80; 303/140, 146, 150
See application file for complete search history.

(56) References Cited

U.S. PATENT DOCUMENTS 6,456,920 B1 * 9/2002 Nishio et al. ................. 701/70

FOREIGN PATENT DOCUMENTS

JP 2002-193085 7/2002

\* cited by examiner

*Primary Examiner*—Yonel Beaulieu
(74) *Attorney, Agent, or Firm*—Buchanan Ingersoll & Rooney PC

(57) ABSTRACT

A motion state estimation apparatus for a vehicle estimates the state of turning on the basis of the fact that changes in the tire pressures of the right-hand wheels and changes in the tire pressures of the left-hand wheels can serve as values which accurately represent the magnitude and direction of a lateral acceleration of the vehicle. The apparatus also estimates the state of acceleration in the fore-aft direction on the basis of the fact that changes in the tire pressures of the front wheels and changes in the tire pressures of the rear wheels can serve as values which accurately represent the magnitude and direction of a fore-aft acceleration of the vehicle. Accordingly, the state of acceleration of the vehicle (accordingly, the motion state of the vehicle) can be accurately estimated without use of expensive acceleration sensors.

15 Claims, 12 Drawing Sheets

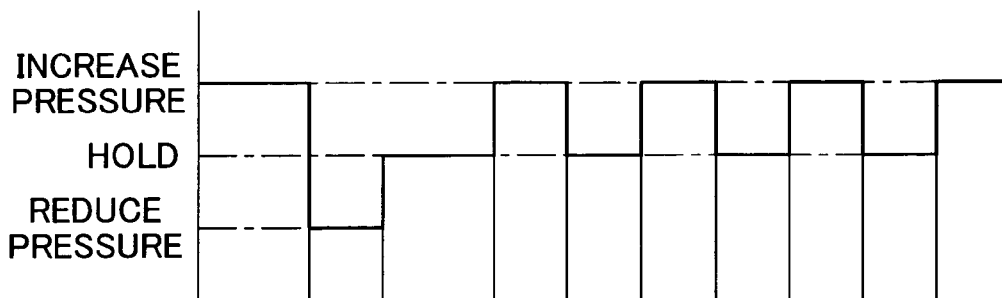
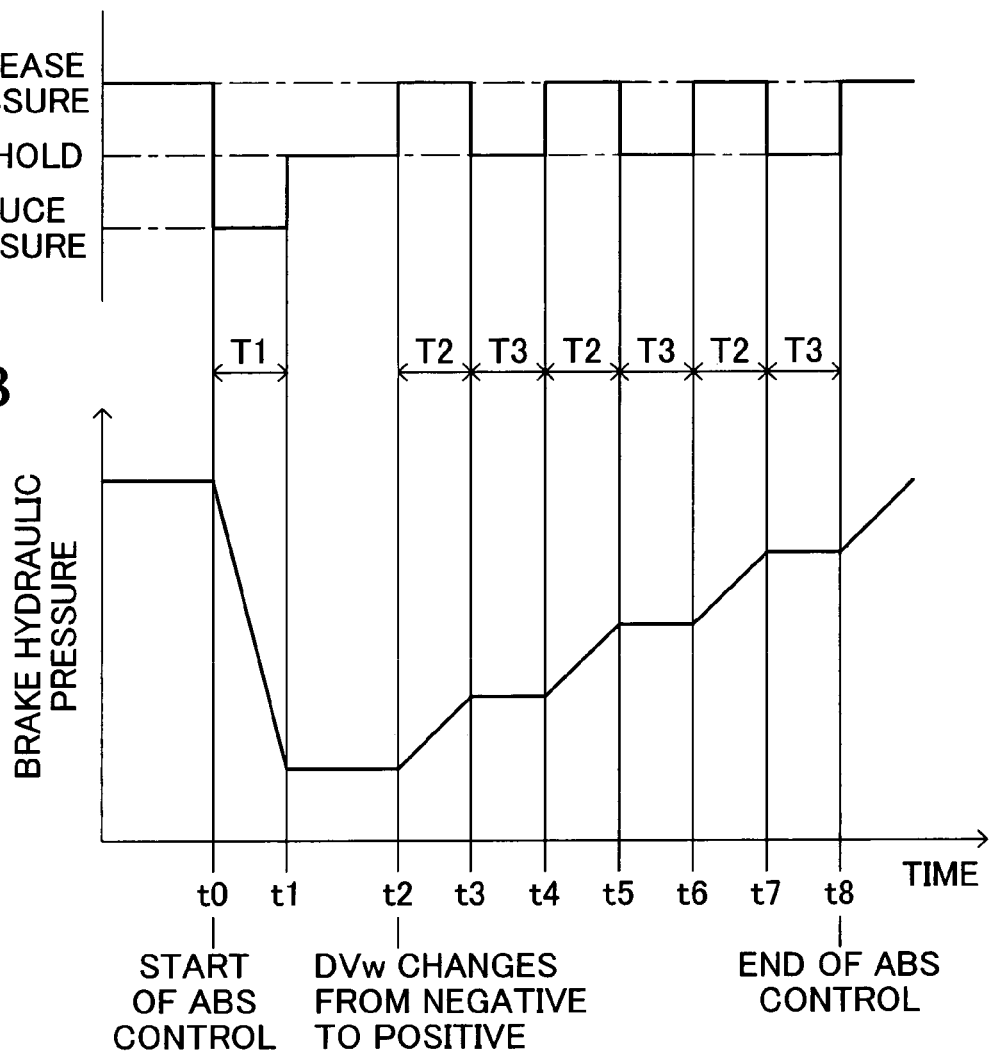

MOTION STATE ESTIMATION APPARATUS FOR VEHICLE AND MOTION STATE CONTROL APPARATUS FOR VEHICLE

BACKGROUND OF THE INVENTION

1. Field of the Invention

The present invention relates to a motion state estimation apparatus for a vehicle adapted to estimate a motion state of a vehicle such as the state of acceleration in the fore-aft direction of the vehicle body and the state of turning of the vehicle.

2. Description of the Related Art

Conventionally, there have been widely known vehicle motion control apparatuses which perform various braking force controls such as antiskid control which at least decreases and increases brake hydraulic pressures supplied to wheel cylinders of wheels of a vehicle so as to adjust braking forces acting on the wheels, to thereby prevent the wheels from generating excessive slippage, and braking force distribution control which imparts a difference between braking force acting on the left-hand wheels of a vehicle and that acting on the right-hand wheels of the vehicle such that a predetermined yawing moment is generated in the vehicle.

In general, such a vehicle motion control apparatus estimates a motion state of a vehicle (for example, the state of acceleration in the fore-aft direction of the vehicle body and the state of turning) on the basis of wheel speeds of individual wheels obtained from wheel speed sensors, and starts and performs the above-mentioned various braking force controls on the basis of the estimated motion state (see, for example, Japanese Patent Application Laid-Open (kokai) No. 2002-193085). However, when the motion state of a vehicle is estimated on the basis of wheel speeds, the estimated motion state of the vehicle involves an error, possibly resulting in a failure to achieve proper braking force control, as described below.

For example, when the vehicle motion control apparatus performs antiskid control, the apparatus sets an estimated vehicle body speed on the basis of the highest speed (hereinafter may be referred to as the "highest wheel speed") among the wheel speeds of the wheels of the vehicle, and starts the antiskid control at least when the difference between the estimated vehicle body speed and the wheel speed (that is, the degree of slippage) becomes equal to or higher than a predetermined level. As a result, when the antiskid control is performed while the vehicle is traveling on an ordinary road surface such as paved road surface, the deceleration of the vehicle is maintained at a high level.

Meanwhile, when a wheel has generated an excess degree of slippage because of a driver's braking operation during a period during which the vehicle has been traveling on a road surface having a low-friction coefficient (hereinafter may be referred to "low-μ road surface") such as an icy road surface, in general, all the wheels tend to start slipping to a generally equal extent. This trend easily occurs in particular in a four-wheel drive (4WD) vehicle in which all the wheels are connected with one another via a drive system.

When all the wheels start to slip to a generally equal extent as described above, a difference is produced between the highest wheel speed and the actual vehicle body speed, and thus an error is generated in the estimated vehicle body speed. As a result, a difference becomes less likely to be generated between the estimated vehicle body speed and the wheel speed, whereby the antiskid control becomes less likely to be started.

Moreover, in such a case, even when the antiskid control is started, due to a small rotational moment in a speed-increasing direction which each tire receives from the road surface, a relatively long time is required for the rotational speed of each wheel having once dropped to recover to a speed corresponding to the vehicle body speed as a result of control for lowering the brake hydraulic pressure. Accordingly, in this case, in order to secure traveling stability of the vehicle, restoring the rotational speed of the wheel must precede maintenance of the large deceleration.

In view of the above, the control mode (for example, control start conditions, brake hydraulic pressure decrease-increase pattern, etc.) of the antiskid control is desirably changed depending on whether the vehicle is traveling on a low-μ road surface such as icy road surface or an ordinary road surface such as a paved road surface. Such operation requires road surface determination; i.e., determination as to whether the road surface on which the vehicle is traveling is the above-mentioned low-μ road surface or ordinary road surface.

The acceleration (deceleration) of the vehicle body during a period during which the wheels undergo slippage because of driver's braking operation depends on the friction coefficient of the road surface. Accordingly, an estimated vehicle body acceleration (estimated vehicle body deceleration) can be calculated from a change in the estimated vehicle body speed, and the road surface can be determined on the basis of the calculated estimated vehicle body deceleration.

However, as described above, when all the wheels start to slip to a generally equal extent during a period during which the vehicle is traveling on a low-μ road surface, the estimated vehicle body speed involves an error. Therefore, the estimated vehicle body deceleration calculated from the estimated vehicle body speed differs from the actual vehicle body deceleration. As a result, in some cases the road surface determination may be performed erroneously. In other words, when the vehicle body deceleration (that is, the state of acceleration in the fore-aft direction of the vehicle body) is estimated on the basis of the wheel speeds, the estimated state of acceleration in the fore-aft direction of the vehicle body involves an error, sometimes resulting in failure to perform proper antiskid control.

Meanwhile, when the vehicle motion control apparatus performs the above-described braking force distribution control, the turning direction of the vehicle must be determined. When the vehicle turns, the wheel speeds of wheels located inside a turning locus become lower than those of wheels located outside the turning locus. On the basis of this phenomenon, the turning direction of the vehicle can be determined. Specifically, the turning direction of the vehicle can be estimated on the basis of the relation of the magnitudes of the wheel speeds of the left-hand and right-hand wheels.

However, in the case where one or more of the wheels separate apart from the road surface because of irregularities on the road surface, the relation of the magnitudes of the wheel speeds of the left-hand and right-hand wheels may become contrary to the relation corresponding to the turning direction. As a result, in some cases the turning direction is determined erroneously. In other words, when the turning direction of the vehicle (that is, the state of turning) is estimated on the basis of the wheel speeds, the estimated state of turning involves an error, sometimes resulting in failure to perform proper braking force distribution control.

As described above, when a motion state of a vehicle is estimated on the basis of the wheel speeds, in some cases the estimated motion state of the vehicle involves an error. Accordingly, in order to properly perform braking force control such as antiskid control or braking force distribution control, accurate estimation of a motion state of a vehicle, such as the state of acceleration in the fore-aft direction of the vehicle body or the state of turning of the vehicle, is desired.

SUMMARY OF THE INVENTION

The present invention has been accomplished in order to cope with the above-described problems, and an object of the present invention is to provide a motion state estimation apparatus for a vehicle which can accurately estimate a motion state of the vehicle, such as the state of acceleration of the vehicle in the fore-aft direction of the vehicle body or the state of turning of the vehicle.

A motion state estimation apparatus for a vehicle according to the present invention is applied to a vehicle equipped with tire pressure obtaining means for obtaining a tire pressure of at least one wheel, and is characterized by provision of motion state estimation means for obtaining a value representing acceleration of the vehicle on the basis of the tire pressure obtained by the tire pressure obtaining means and for estimating a motion state of the vehicle on the basis of the obtained value representing acceleration of the vehicle.

In this case, the motion state estimation means is preferably configured to obtain the value representing acceleration of the vehicle on the basis of a change in the tire pressure obtained by the tire pressure obtaining means. The tire pressure obtaining means may be means including a pressure sensor capable of directly detecting the tire pressure or means for indirectly obtaining the tire pressure of the wheel on the basis of the resonance frequency of the unsprung mass of the vehicle, which is extracted from an output signal of a wheel speed sensor (e.g., a magnetic pickup type (coil type) wheel speed sensor) capable of outputting a signal including a component of the vibration frequency of the corresponding tire.

When an acceleration is generated in the vehicle, an inertial force acts on the body of the vehicle in a direction opposite the direction of the acceleration. As a result, the load received by the wheels on the side corresponding to the direction in which the inertial force acts on the vehicle body increases by an amount corresponding to the magnitude of the inertial force, and the load received by the wheels on the side opposite the side corresponding to the direction in which the inertial force acts on the vehicle body decreases by an amount corresponding to the magnitude of the inertial force.

Meanwhile, the pressure of a tire attached to each wheel changes depending on the load received by the wheel, and increases with the load. Therefore, when an acceleration is generated in the vehicle, the tire pressure of each wheel changes depending on the direction and magnitude of the acceleration. In other words, accurate information regarding acceleration (the direction and magnitude thereof) of the vehicle can be obtained through monitoring the tire pressure (or change in the tire pressure).

Accordingly, as in the above-described configuration, a value representing acceleration of the vehicle can be obtained on the basis of the pressure (or change in the pressure) of the tire of at least one wheel. Examples of the "value representing acceleration of the vehicle" include the amount of change in the tire pressure of a specific wheel(s) and the gradient of change in the tire pressure. The state of acceleration of the vehicle and accordingly the motion state of the vehicle can be accurately estimated on the basis of the value representing acceleration of the vehicle.

When the motion state estimation apparatus according to the present invention estimates the state of acceleration of the vehicle in the fore-aft direction of the vehicle body, the motion state estimation means is configured to obtain, as the value representing acceleration of the vehicle, a value representing fore-aft acceleration, which is a component of acceleration of the vehicle along the fore-aft direction of the vehicle body, and estimate the state of acceleration of the vehicle in the fore-aft direction of the vehicle body on the basis of the obtained value representing fore-aft acceleration.

For example, when a vehicle accelerates or decelerates during a straight travel, an inertial force acts on the vehicle body toward the rear or front of the vehicle body. In this case, the tire pressures of the front wheels of the vehicle decrease or increase, and the tire pressures of the rear wheels of the vehicle increase or decrease. Accordingly, the amount of change (gradient of change) in the tire pressure of at least one of the front wheels of the vehicle or the amount of change (gradient of change) in the tire pressure of at least one of the rear wheels of the vehicle can serve as the "value representing fore-aft acceleration," and the state of acceleration of the vehicle in the fore-aft direction of the vehicle body can be estimated accurately on the basis of the "value representing fore-aft acceleration."

When the motion state estimation apparatus according to the present invention estimates the state of acceleration of the vehicle in the fore-aft direction of the vehicle body, the motion state estimation means is preferably to obtain, by use of the tire pressure obtaining means, a tire pressure of at least one front wheel of the vehicle and a tire pressure of at least one rear wheel of the vehicle.

By virtue of this configuration, the amount of change in the tire pressure of at least one front wheel of the vehicle and the amount of change in the tire pressure of at least one rear wheel of the vehicle can be obtained as the value representing fore-aft acceleration. Accordingly, the state of acceleration of the vehicle in the fore-aft direction of the vehicle body can be estimated more accurately on the basis of a larger number of values each representing the fore-aft acceleration, as compared to the case where the amount of change in the tire pressure of only one wheel (one front wheel or one rear wheel) of the vehicle is obtained.

In this case, the motion state estimation means is preferably configured to obtain, by use of the tire pressure obtaining means, tire pressures of two front wheels of the vehicle as the tire pressure of the front wheel and tire pressures of two rear wheels of the vehicle as the tire pressure of the rear wheel.

By virtue of this configuration, the amounts of changes in the tire pressures of two front wheels of the vehicle and the amounts of changes in the tire pressures of two rear wheels of the vehicle (that is, the amounts of changes in the tire pressures of all the four wheels) can be obtained as the "value representing fore-aft acceleration." Accordingly, the state of acceleration of the vehicle in the fore-aft direction of the vehicle body can be estimated more accurately on the basis of a larger number of values each representing the fore-aft acceleration.

When the motion state estimation apparatus according to the present invention estimates the state of turning of the vehicle, the motion state estimation means is configured to obtain, as the value representing acceleration of the vehicle, a value representing lateral acceleration, which is a component of acceleration of the vehicle along the lateral direction of the vehicle body, and estimate the state of turning (e.g., turning direction) of the vehicle on the basis of the obtained value representing lateral acceleration.

For example, when a vehicle turns to the left or right, an inertial force (that is, centrifugal force) acts on the vehicle body rightward or leftward. In this case, the tire pressures of the left-hand wheels of the vehicle decrease or increase, and the tire pressures of the right-hand wheels of the vehicle increase or decrease. Accordingly, the amount of change (gradient of change) in the tire pressure of at least one of the left-hand wheels of the vehicle or the amount of change (gradient of change) in the tire pressure of at least one of the right-hand wheels of the vehicle can serve as the "value representing lateral acceleration," and the state of turning of the vehicle can be estimated accurately on the basis of the "value representing lateral acceleration."

When the motion state estimation apparatus according to the present invention estimates the state of turning of the vehicle, the motion state estimation means is preferably configured to obtain, by use of the tire pressure obtaining means, a tire pressure of at least one right-hand wheel of the vehicle and a tire pressure of at least one left-hand wheel of the vehicle.

By virtue of this configuration, the amount of change in the tire pressure of at least one right-hand wheel of the vehicle and the amount of change in the tire pressure of at least one left-hand wheel of the vehicle can be obtained as the value representing lateral acceleration. Accordingly, the state of turning of the vehicle can be estimated more accurately on the basis of a larger number of values each representing the lateral acceleration, as compared to the case where the amount of change in the tire pressure of only one wheel (one right-hand wheel or one left-hand wheel) of the vehicle is obtained.

In this case, the motion state estimation means is preferably configured to obtain, by use oft the tire pressure obtaining means, tire pressures of front and rear right-hand wheels of the vehicle as the tire pressure of the right-hand wheel and tire pressures of front and rear left-hand wheels of the vehicle as the tire pressure of the left-hand wheel.

By virtue of this configuration, the amounts of changes in the tire pressures of the front and rear right-hand wheels of the vehicle and the amounts of changes in the tire pressures of the front and rear left-hand wheels of the vehicle (that is, the amounts of changes in the tire pressures of all the four wheels) can be obtained as the "value representing lateral acceleration." Accordingly, the state of turning of the vehicle can be estimated more accurately on the basis of a larger number of values each representing the lateral acceleration.

A motion control apparatus for a vehicle according to the present invention, which performs antiskid control utilizing the results of estimation of the state of acceleration in the fore-aft direction of the vehicle body performed by the motion state estimation apparatus of the present invention, is applied to a vehicle equipped with tire pressure obtaining means for obtaining a tire pressure of at least one wheel of the vehicle and wheel speed obtaining means for obtaining a wheel speed of the wheel of the vehicle. The motion control apparatus comprises antiskid control means for issuing an instruction for performing antiskid control for preventing generation of excessive slippage of the wheel on the basis of at least the obtained wheel speed and the state of acceleration in the fore-aft direction of the vehicle body estimated by the motion state estimation means on the basis of the obtained tire pressure.

By virtue of this configuration, the antiskid control can be performed on the basis of the results of accurate estimation regarding the state of acceleration in the fore-aft direction of the vehicle body performed by the motion state estimation means. Therefore, the antiskid control can be properly performed.

More specifically, preferably, the antiskid control means comprises road surface determination means for determining whether a road surface on which the vehicle is traveling is the above-described low-μ road surface on the basis of at least the estimated state of acceleration in the fore-aft direction of the vehicle body, and is configured to change the control mode of the antiskid control according to the results of the determination by the road surface determination means.

By virtue of the above configuration, when the above-described road surface determination is performed on the basis of acceleration (deceleration) of the vehicle body in the case where the wheels undergo slippage because of braking operation by a driver as described above, the road surface determination can be performed on the basis of the results of accurate estimation regarding the state of acceleration in the fore-aft direction of the vehicle body.

As a result, the determination as to whether a road surface on which the vehicle is traveling is the above-mentioned low-μ road surface or not can be performed accurately, and the antiskid control can be performed in a proper antiskid control mode (e.g., control start conditions, brake hydraulic pressure reducing and increasing pattern) corresponding to the road surface. Accordingly, it is possible to prevent the problem that antiskid control is not started in a state in which the antiskid control must be started and the problem that that antiskid control is started in a state in which the antiskid control must not be started.

A motion control apparatus for a vehicle according to the present invention, which performs braking force distribution control utilizing the results of estimation of the state of turning performed by the motion state estimation apparatus of the present invention, is applied to a vehicle equipped with tire pressure obtaining means for obtaining a tire pressure of at least one wheel of the vehicle. The motion control apparatus comprises braking force distribution control means for issuing an instruction for performing braking force distribution control which imparts a difference between a braking force acting on a left-hand wheel of the vehicle and a braking force acting on a right-hand wheel of the vehicle, on the basis of at least the state of turning of the vehicle estimated by the motion state estimation apparatus on the basis of the obtained tire pressure, such that a predetermined yawing moment is generated in the vehicle.

By virtue of this configuration, the braking force distribution control can be performed on the basis of the results of accurate estimation regarding the state of turning (e.g., turning direction) of the vehicle performed by the motion state estimation means. Therefore, the braking force distribution control can be properly performed.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 4 is a time chart showing ABS control for ordinary road surface which is performed by the motion control apparatus shown in FIG. 1, wherein section (a) shows changeovers among the basic brake hydraulic pressure control modes for a controlled wheel for which ABS control is performed, and section (b) shows changes in the brake hydraulic pressure associated with the controlled wheel because of changeovers among the brake hydraulic pressure control modes;

DESCRIPTION OF THE PREFERRED EMBODIMENT

Figure 1:
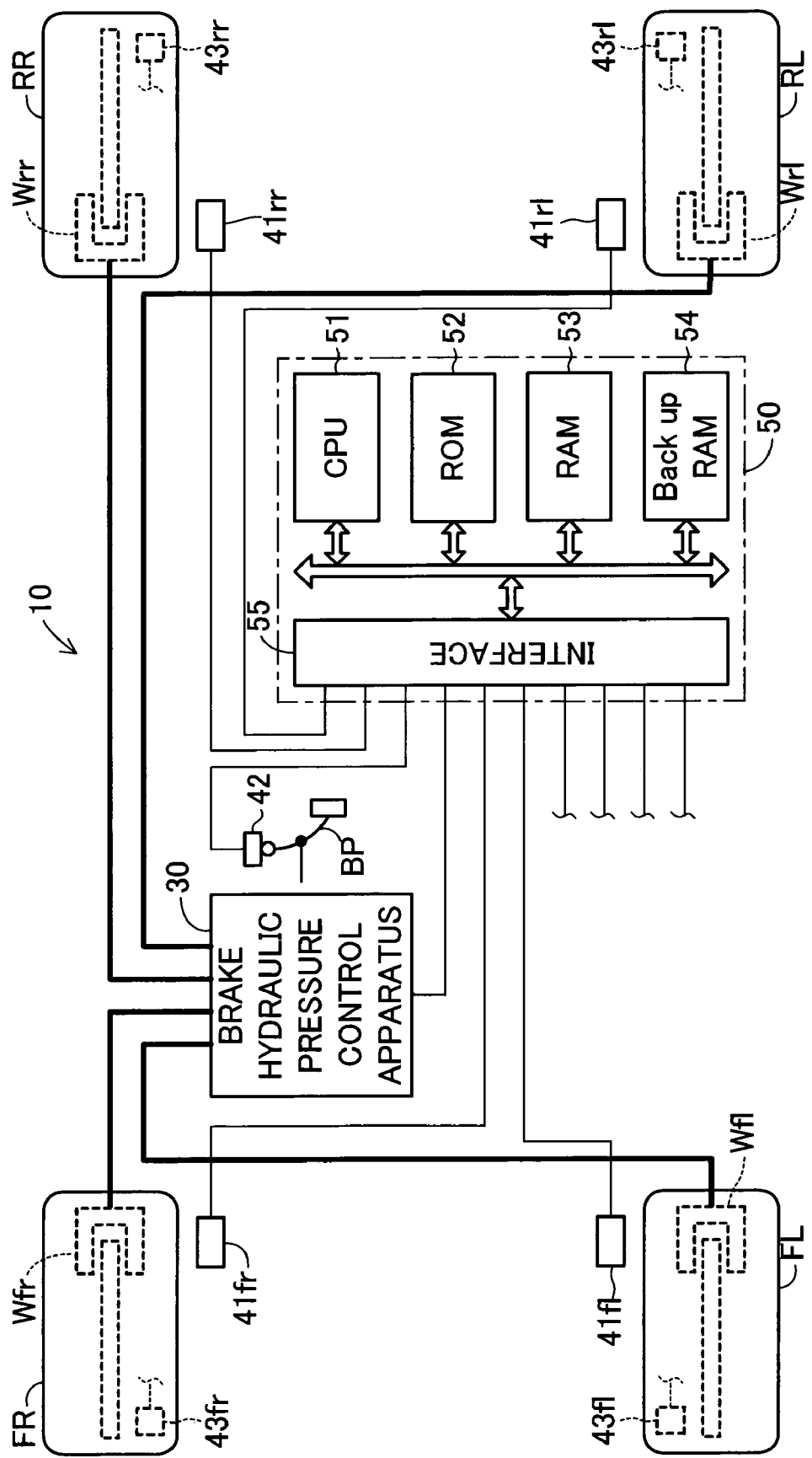
FIG. 1 is a schematic diagram of a vehicle equipped with a motion control apparatus including a motion state estimation apparatus according to an embodiment of the present invention.

A motion control apparatus including a motion state estimation apparatus for a vehicle according to an embodiment of the present invention will be described with reference to the drawings. FIG. 1 schematically shows the structure of a vehicle equipped with the motion control apparatus, generally denoted by 10. The illustrated vehicle is a four-wheel drive (4WD) vehicle having two front wheels (a front left wheel FL and a front right wheel FR), which are drive wheels, and two rear wheels (a rear left wheel RL and a rear right wheel RR), which are also drive wheels.

This motion control apparatus 10 includes a brake hydraulic pressure control apparatus 30 for generating braking force in each wheel by means of brake hydraulic pressure.

Figure 2:
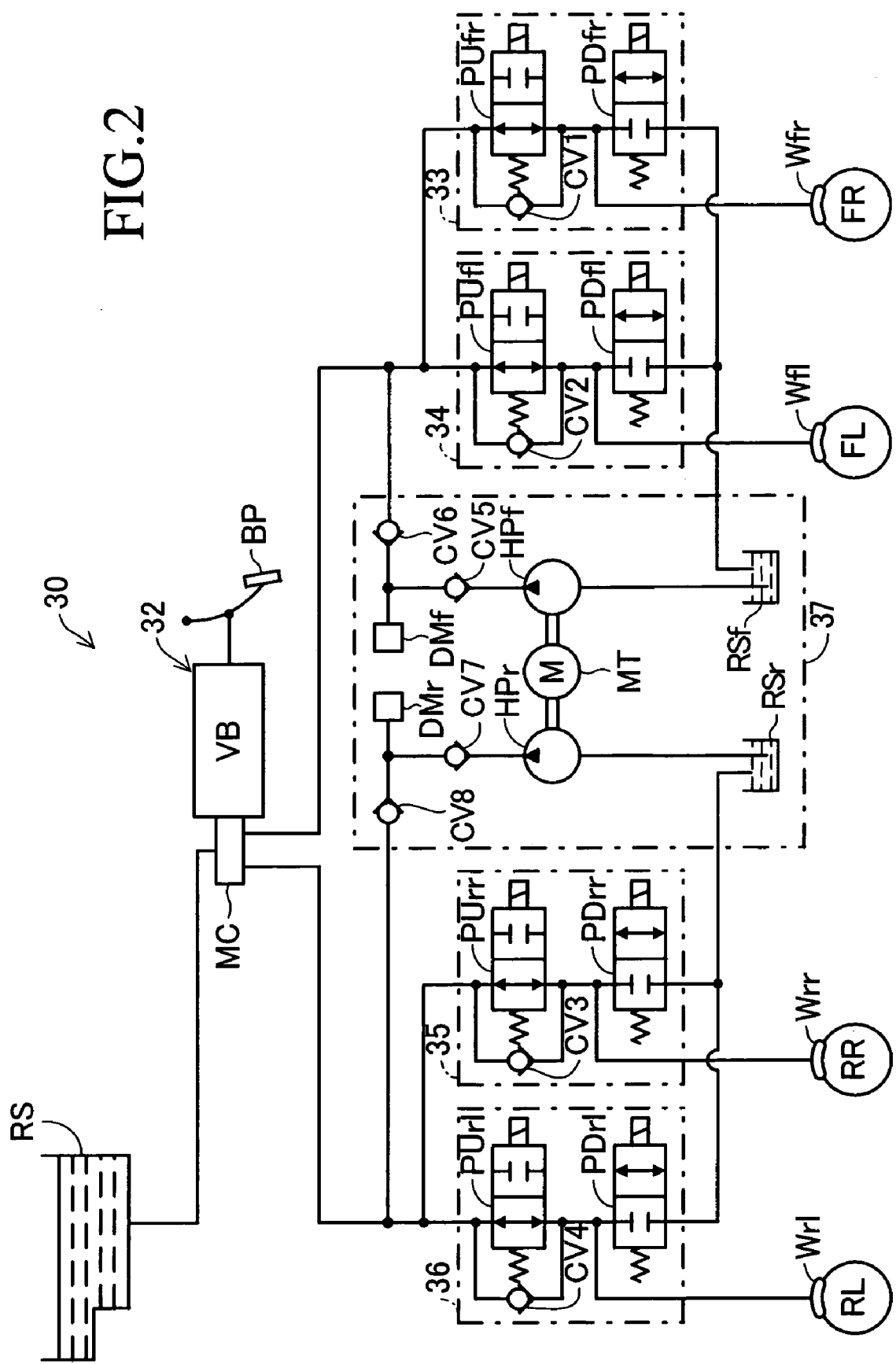
FIG. 2 is a schematic diagram of a brake hydraulic pressure control apparatus shown in FIG. 1.

As schematically shown in FIG. 2, the brake hydraulic pressure control apparatus 30 includes a brake hydraulic pressure generating section 32 which generates brake hydraulic pressure corresponding to the operating force of a brake pedal BP; an FR brake hydraulic pressure adjusting section 33, an FL brake hydraulic pressure adjusting section 34, an RR brake hydraulic pressure adjusting section 35, and an RL brake hydraulic pressure adjusting section 36, which can adjust the brake hydraulic pressures supplied to corresponding wheel cylinders Wfr, Wfl, Wrr, and Wrl respectively installed on the wheels FR, FL, RR, and RL; and a return brake fluid supply section 37.

The brake hydraulic pressure generating section 32 includes a vacuum booster VB which operates in response to operation of the brake pedal BP, and a master cylinder MC which is linked to the vacuum booster VB. The vacuum booster VB utilizes the pressure (negative pressure) of air within an intake pipe of an unillustrated engine so as to boost the operating force of the brake pedal BP by a prescribed ratio and transmits the boosted operating force to the master cylinder MC.

The master cylinder MC has two output ports; i.e., a first port and a second port. The master cylinder MC receives brake fluid from a reservoir RS, and generates from the first port a first master cylinder hydraulic pressure corresponding to the boosted operating force. The master cylinder MC also generates from the second port a second master cylinder hydraulic pressure which is substantially the same as the first master cylinder hydraulic pressure and which corresponds to the boosted operating force. The structures and operations of the master cylinder MC and the vacuum booster VB are well known, and therefore an explanation of the details thereof will be omitted. In this manner, the master cylinder MC and the vacuum booster VB generate first and second master cylinder hydraulic pressures corresponding to the operating force of the brake pedal BP.

The first port of the master cylinder MC is connected to the upstream side of the FR brake hydraulic pressure adjusting section 33 and the upstream side of the FL brake hydraulic pressure adjusting section 34. Similarly, the second port of the master cylinder MC is connected to the upstream side of the RR brake hydraulic pressure adjusting section 35 and the upstream side of the RL brake hydraulic pressure adjusting section 36. Thus, the first master cylinder hydraulic pressure is supplied to the upstream side of the FR brake hydraulic pressure adjusting section 33 and the upstream side of the FL brake hydraulic pressure adjusting section 34, and the second master cylinder hydraulic pressure is supplied to the upstream side of the RR brake hydraulic pressure adjusting section 35 and the upstream side of the RL brake hydraulic pressure adjusting section 36.

The FR brake hydraulic pressure adjusting section 33 consists of a pressure-increasing valve PUfr, which is a normally-open solenoid valve of a 2-port, 2-position type, and a pressure-reducing valve PDfr, which is a normally-closed solenoid valve of a 2-port, 2-position type. When the pressure-increasing valve PUfr is in its first position (a position in a non-excited state) shown in FIG. 2, it establishes communication between the upstream side of the FR brake hydraulic pressure adjusting section 33 and the wheel cylinder Wfr. When the pressure-increasing valve PUfr is in its second position (a position in an excited state), it breaks the communication between the upstream side of the FR brake hydraulic pressure adjusting section 33 and the wheel cylinder Wfr. When the pressure-reducing valve PDfr is in its first position (a position in a non-excited state) shown in FIG. 2, it breaks communication between the wheel cylinder Wfr and a reservoir RSf. When the pressure-reducing valve PDfr is in its second position (a position in an excited state), it establishes the communication between the wheel cylinder Wfr and the reservoir RSf.

With this structure, when the pressure-increasing valve PUfr and the pressure-reducing valve PDfr are in their first positions, the hydraulic pressure in the wheel cylinder Wfr is increased upon supply of pressurized brake fluid from the upstream side of the FR brake hydraulic pressure adjusting section 33 into the wheel cylinder Wfr. When the pressure-increasing valve PUfr is in the second position and the pressure-reducing valve PDfr is in the first position, regardless of the hydraulic pressure in the upstream side of the FR brake hydraulic pressure adjusting section 33, the hydraulic pressure in the wheel cylinder Wfr at the time of changeover is maintained. When the pressure-increasing valve PUfr and the pressure-reducing valve PDfr are in their second positions, the brake fluid within the wheel cylinder Wfr is allowed to return to the reservoir RSf, whereby the hydraulic pressure in the wheel cylinder Wfr is decreased.

A check valve CV1 which allows flow-of the brake fluid in only one direction from the wheel cylinder Wfr side to the upstream side of the FR brake hydraulic pressure adjusting section 33 is connected in parallel with the pressure-increasing valve PUfr. As a result, when the brake pedal BP is released after being operated, the brake hydraulic pressure in the wheel cylinder Wfr is rapidly decreased.

Similarly, the FL brake hydraulic pressure adjusting section 34, the RR brake hydraulic pressure adjusting section 35, and the RL brake hydraulic pressure adjusting section 36 comprise a pressure-increasing valve PUfl and a pressure-reducing valve PDfl, a pressure-increasing valve PUrr and a pressure-reducing valve PDrr, and a pressure-increasing valve PUrl and a pressure-reducing valve PDrl, respectively. By controlling the positions of each pressure-increasing valve and pressure-reducing valve, the brake hydraulic pressure in the wheel cylinder Wfl, the wheel cylinder Wrr, and the wheel cylinder Wrl can be increased, maintained, or decreased. Checks valves CV2, CV3, and CV4 are provided in parallel with the pressure-increasing valves PUfl, PUrr, and PUrl, respectively, to provide the same function as that of the check valve CV1.

The return brake fluid supply section 37 includes a DC motor MT, and two hydraulic pumps HPf and HPr simultaneously driven by the motor MT. The hydraulic pump HPf pumps the brake fluid returned from the pressure-reducing valves PDfr and PDfl to the reservoir RSf, and supplies the pumped brake fluid to the upstream sides of the FR brake hydraulic pressure adjusting section 33 and the FL brake hydraulic pressure adjusting section 34 via check valves CV5 and CV6.

Similarly, the hydraulic pump HPr pumps the brake fluid returned from the pressure-reducing valves PDrr and PDrl to the reservoir RSr, and supplies the pumped brake fluid to the upstream sides of the RR brake hydraulic pressure adjusting section 35 and the RL brake hydraulic pressure adjusting section 36 via check valves CV7 and CV8. Notably, in order to reduce pulsations of discharge pressures of the hydraulic pumps HPf and HPr, dampers DMf and DMr are disposed in a hydraulic circuit between the check valves CV5 and CV6 and a hydraulic circuit between the check valves CV7 and CV8, respectively.

With the structure described above, when all the solenoid valves are in their first positions, the brake hydraulic pressure control apparatus 30 supplies to each wheel cylinder a brake hydraulic pressure corresponding to the operating force of the brake pedal BP. In this state, it become possible to decrease only the brake hydraulic pressure in, for example, the wheel cylinder Wrr by a prescribed amount through control of the pressure-increasing valve PUrr and the pressure-reducing valve PDrr. That is, the brake hydraulic pressure control apparatus 30 can individually decrease the brake hydraulic pressure in the wheel cylinder of each wheel from the brake hydraulic pressure corresponding to the operating force of the brake pedal BP.

Referring back to FIG. 1, the motion control apparatus 10 includes magnetic pickup type (coil type) wheel speed sensors 41$fr$, 41$fl$, 41$rr$, and 41$rl$ which each output a signal whose frequency changes in accordance with the rotational speed of the corresponding wheel; a brake switch 42 which outputs a STP signal which assume an ON level or OFF level potential in accordance with the presence or absence of operation of a brake pedal BP; and tire pressure sensors 43$fr$, 43$fl$, 43$rr$, and 43$rl$ (tire pressure obtaining means) which directly detect the air pressures of respective tires (hereinafter referred to as "tire pressures") and output signal indicating the tire pressures Pfr, Pfl, Prr, and Prl. Notably, the wheel speed sensors may be semiconductor sensors (in particular, sensors each utilizing a magnetoresistance element (MR element)).

The electronic controller 50 is a microcomputer which includes a CPU 51; ROM 52 in which are previously stored routines (programs) to be executed by the CPU 51, tables (look-up tables and maps), constants, and the like; RAM 53 in which the CPU 51 temporarily stores data as necessary; backup RAM 54 which stores data when the power supply is on and which maintains the stored data when the power supply is cut off; an interface 55 containing A/D converters; and the like. The above components are interconnected via a bus.

The interface 55 is connected to the sensors, etc. 41 to 43. The interface 55 supplies signals from the sensors, etc. 41 to 43 to the CPU 51. Further, in accordance with instructions from the CPU 51, the interface 55 outputs drive signals the solenoid valves and the motor MT of the brake hydraulic pressure control apparatus 30.

Outline of Braking Force Distribution Control

Next, there will be described braking force distribution control (hereinafter also referred to as "BFD control") performed by the motion control apparatus 10 (hereinafter may be referred to as the "present apparatus") including the motion state estimation apparatus according to the embodiment of the present and having the above-described configuration.

If a driver is performing braking operation when the vehicle starts to turn in a state in which the vehicle goes straight (hereinafter also referred to as the "initial stage of turning"), two forces act on the vehicle body. That is, an inertial force corresponding to a deceleration (fore-aft acceleration) of the vehicle stemming from the braking operation acts on the vehicle body toward the front of the vehicle body. At the same time, an inertial force (that is, centrifugal force) corresponding to a lateral acceleration generated as a result of the turning acts on the vehicle body toward the outside of a turning locus. As a result, loads received by the rear wheels of the vehicle decrease by an amount corresponding to the inertial force acting toward the front of the vehicle body, whereby the maximum friction generated between the rear wheels (tires) of the vehicle and road surface decreases.

As a result, the magnitude of the deceleration (accordingly, inertial force) based on the braking operation and the magnitude of the centrifugal force (when the centrifugal force is large) may become greater than the magnitude of a component of the maximum friction generated between the rear wheels of the vehicle and road surface, the component being in the direction toward the inner side of the turning locus. In this case, the rear wheels of the vehicle start to slip toward the outer side of the turning locus, and thus, the vehicle tends to spin.

In order to suppress the tendency of spinning, a yawing moment of a direction opposite the turning direction must be forcedly generated in the vehicle. In order to forcedly generate a yawing moment (spin-suppressing yawing moment M) in the vehicle in the direction opposite the turning direction, the turning direction of the vehicle is determined, and a difference is imparted between the braking forces (the total sum thereof) acting on the left-hand wheels of the vehicle and the braking forces (the total sum thereof) acting on the right-hand wheels of the vehicle such that the braking forces (the total sum thereof) acting on the wheels located on the inner side of the turning locus become smaller than the braking forces (the total sum thereof) acting on the wheels located on the outer side of the turning locus.

The turning direction of the vehicle can be determined on the basis of changes in the tire pressures. That is, when the vehicle is in the initial stage of turning, as described above, a centrifugal force starts to act on the vehicle body toward the outer side of the turning locus. Accordingly, in the initial stage of turning, the tire pressure of the wheel located on the outer side of the turning locus increases in accordance with the magnitude of the centrifugal force, and the tire pressure of the wheel located on the inner side of the turning locus decreases in accordance with the magnitude of the centrifugal force.

Accordingly, the state in which the tire pressure of one of the left-hand wheel of the vehicle and the right-hand wheel of the vehicle increases, and that of the remaining wheel decreases, means that the vehicle is in the initial stage of turning of the vehicle in the direction toward the side on which the tire pressure decreases. From this, the turning direction of the vehicle can be determined.

Further, the degree of the spinning tendency increases with the magnitude of the centrifugal force. Meanwhile, the greater the centrifugal force, the greater the changes (gradients of the changes) in tire pressures of the left-hand and right-hand wheels of the vehicle. That is, the greater the changes (gradients of the changes) in tire pressures of the left-hand and right-hand wheels of the vehicle, the greater the degree of the spinning tendency.

In view of the above, for each wheel, the present apparatus periodically monitors (e.g., at intervals of 6 msec) the tire pressure $P$ of the respective wheel, detected by means of the tire pressure sensor $43$, and periodically calculates for each wheel a tire pressure change amount $\Delta P$ (a value obtained by subtracting the previous tire pressure from the present tire pressure). Notably, the symbol "" appended to various variables and the like collectively represents the symbols fl, fr, rl, and rr and indicates that the particular variable or the like applies to all of the wheels FR, FL, etc. of the vehicle. For example, the tire pressure sensor $43**$ collectively indicates the tire pressure sensor $43fr$ for the front right wheel, the tire pressure sensor $43fl$ for the front left wheel, the tire pressure sensor $43rr$ for the rear right wheel, and the tire pressure sensor $43rl$ for the rear left wheel.

The present apparatus starts BFD control when the STP signal is at the ON level, one of the tire pressure change amount of the left-hand wheels of the vehicle (in the present embodiment, the average of $\Delta Pfl$ and $\Delta Prl$ (the average left-hand tire pressure change amount $\Delta Plemean$)) and the tire pressure change amount of the right-hand wheels of the vehicle (in the present embodiment, the average of $\Delta Pfr$ and $\Delta Prr$ (the average right-hand tire pressure change amount $\Delta Primean$)) is greater than a BFD control start determination reference value $\Delta Pthbfd$ (a constant positive value), and the other tire pressure change amount is less than a value "$-\Delta Pthbfd$." Specifically, the present apparatus holds the brake hydraulic pressure of the rear wheel whose tire pressure change amount is less than the value "$-\Delta Pthbfd$" (i.e., the rear wheel located on the inner side of a turning locus), and continues the operation of holding the brake hydraulic pressure until the STP signal changes from the ON level to the OFF level.

Figure 3:
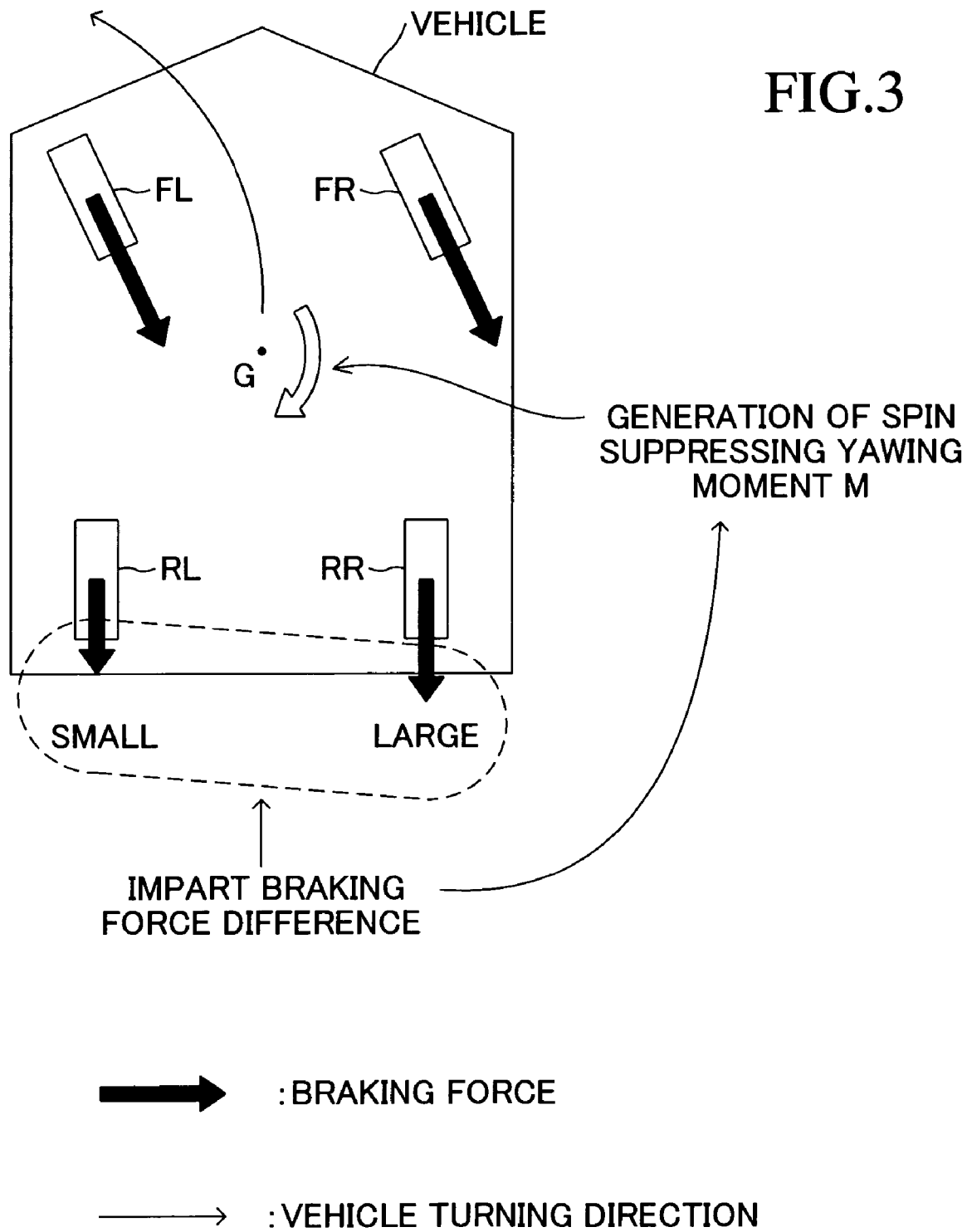
FIG. 3 is a view used for describing the details of BFD control performed by the motion control apparatus shown in FIG. 1.

For example, when the vehicle is in the initial stage of left turning as shown in FIG. 3, the average right-hand tire pressure change amount $\Delta Primean$ increases, and the average left-hand tire pressure change amount $\Delta Plemean$ decreases. At this time, if the STP signal is at the ON level, and both the inequality "average right-hand tire pressure change amount $\Delta Primean > \Delta Pthbfd$" and the inequality "average left-hand tire pressure change amount $\Delta Plemean < -\Delta Pthbfd$" are satisfied, the present apparatus holds the brake hydraulic pressure of the rear left wheel RL until the STP signal changes to the OFF level.

By virtue of this operation, when the brake hydraulic pressure attributable to dirver's braking operation further increases after start of the operation of holding the brake hydraulic pressure, the braking force acting on the rear left wheel RL becomes smaller than that acting on the rear right wheel RR, whereby a difference is produced between the braking forces acting on the rear wheels as shown in FIG. 3. As a result, a spin-suppressing yawing moment M is generated about the centroid G of the vehicle in the clockwise direction as viewed from the upper side of the vehicle, and thus, generation of spinning tendency is prevented.

As described above, the present invention estimates the state of turning of the vehicle on the basis of the average right-hand tire pressure change amount $\Delta Primean$ and the average left-hand tire pressure change amount $\Delta Plemean$, which serve as a value representing lateral acceleration, and starts and performs the BFD control on the basis of the estimated state of turning. The above is the outline of the BFD control performed by the present apparatus.

Outline of Antiskid Control

Next, there will be described antiskid control (hereinafter also referred to as "ABS control") performed by the present apparatus. As described below, the present apparatus determines whether the road surface on which the vehicle is traveling is (possibly) a low-μ road surface having a friction coefficient smaller than a predetermined friction coefficient (e.g., an icy road surface) or an ordinary road surface having a friction coefficient equal to or higher than the predetermined friction coefficient (e.g., a paved road surface), and in accordance with the results of the determination selectively performs ABS control for ordinary road surface or ABS control for low-μ road surface. The ABS control for ordinary road surface and the ABS control for low-μ road surface differ in terms of control mode (that is, control start conditions, and brake hydraulic pressure reducing, holding, and increasing patterns).

<Outline of ABS Control for Ordinary Road Surface>

First, the ABS control for ordinary road surface will be described. The main purpose of the ABS control for ordinary road surface is maintaining a desired deceleration. For ABS control, the present apparatus periodically calculates the wheel speed $Vw$ of the respective wheel on the basis of the output of the wheel speed sensor $41$, and periodically calculates the wheel acceleration $DVw$ of the respective wheel from a change in the wheel speed $Vw$ with time.

Meanwhile, the present apparatus periodically obtains an estimated vehicle body speed $Vso$ of the vehicle in accordance with Eq. (1) described below. In Eq. (1), the function max is a function for selecting the maximum value among the respective arguments. The value gradlimit represents a maximum decrease amount of the vehicle body speed per unit time (the maximum gradient of decrease of the vehicle body speed) which the vehicle can actually achieve during deceleration, and is constant in the present embodiment. Notably, in the case where the present apparatus is equipped with means for periodically obtaining the friction coefficient of the road surface on which the vehicle is traveling, the present apparatus may be configured to change the value gradlimit in accordance with the obtained road surface friction coefficient. Δt represents intervals of computation of the estimated vehicle body speed Vso by the CPU 51.

$$Vso = \max(\max(Vw^{**}), Vso - \text{gradlimit} \cdot \Delta t) \quad (1)$$

As can be understood from Eq. (1), the present estimated vehicle body speed Vso can be obtained as the greater of the present maximum wheel speed max(Vw**) and the value obtained by subtracting from the previous estimated vehicle body speed Vso the product of the value gradlimit and Δt.

Subsequently, as described later, when the road surface on which the vehicle is traveling has been determined to be an ordinary surface, upon satisfaction of Eqs. (2) and (3) described below, the present apparatus starts ABS control for ordinary road surface for the wheel**. That is, the following Eqs. (2) and (3) represent (a portion of) conditions for starting the ABS control for ordinary road surface.

$$Vso - Vw^{**} > \Delta Vwrefnorm \quad (2)$$

$$DVw^{**} < DVwrefnorm \quad (3)$$

In Eq. (2), "Vso−Vw" represents the amount of slippage of the wheel. ΔVwrefnorm represents a slippage amount reference value (constant, positive value) for ABS control start determination for ordinary road surface. In Eq. (3), DVwrefnorm represents a wheel acceleration reference value (constant, negative value) for ABS control start determination for ordinary road surface.

When the conditions for starting the ABS control for ordinary road surface are satisfied, the present apparatus immediately starts the ABS control for ordinary road surface as shown in FIG. 4. Section (a) of FIG. 4 is a time chart showing changeovers among the basic brake hydraulic pressure control modes (pressure-increasing mode, holding mode, and pressure-reducing mode) associated with a wheel for which the ABS control for ordinary road is performed (that is, a wheel for which the conditions for starting the ABS control for ordinary road surface are satisfied at time t0) (hereinafter referred to as the "controlled wheel"), during a period between time t0, at which the ABS control for ordinary road surface (a single cycle thereof) is started, and time t8, at which the ABS control for ordinary road surface is ended. Section (b) of FIG. 4 shows changes in the brake hydraulic pressure associated with the controlled wheel caused by changeovers among the brake hydraulic pressure control modes.

As can be understood from sections (a) and (b) of FIG. 4, the present apparatus changes the brake hydraulic pressure control mode for the controlled wheel from the pressure-increasing mode (a state in which ABS control is not performed) to the pressure-reducing mode at time t0. After that, the present apparatus maintains the pressure-reducing mode until time t1 or until a predetermined pressure-reducing time T1 for ordinary road surface elapses, and then at time t1 changes the brake hydraulic pressure control mode from the pressure-reducing mode to the holding mode. As a result, the brake hydraulic pressure associated with the controlled wheel continuously drops during the period between time t0 and time t1, and the brake hydraulic pressure at time t1 is maintained after time t1. As a result, the wheel acceleration DVw of the controlled wheel increases, and the value of the wheel acceleration DVw is assumed to have changed from a negative value to a positive value at time t2.

When time t2 has come, the present apparatus changes the brake hydraulic pressure control mode for the controlled wheel from the holding mode to the pressure-increasing mode. After that, the present apparatus maintains the pressure-increasing mode until time t3 or until a predetermined pressure-increasing time T2 for ordinary road surface elapses, and then changes the brake hydraulic pressure control mode from the pressure-increasing mode to the holding mode at time t3. After that, the present apparatus maintains the pressure-holding mode until time t4 or until a predetermined holding time T3 for ordinary road surface elapses. As a result, the brake hydraulic pressure associated with the controlled wheel continuously increases during the period between time t2 and time t3, and the pressure at time t3 is maintained during the period between time t3 and time t4.

Even after time t4, the present apparatus repeats an operation similar to that performed in the period of time t2 to time t4; i.e., the operation of maintaining the brake hydraulic pressure control mode for the controlled wheel in the pressure-increasing mode over the predetermined pressure-increasing time T2 for ordinary road surface, and then in the holding mode over the predetermined holding time T3 for ordinary road surface, during the periods of time t4 to time t6 and time t6 to time t8 (that is, the present apparatus performs the processing of the period of time t2 to time t4 three times). At time t8, the present apparatus ends the ABS control for ordinary road surface (one cycle thereof) by switching the brake hydraulic pressure control mode for the controlled wheel from the holding mode to the pressure-increasing mode (a state in which ABS control is not performed).

The pressure-reducing time T1 for ordinary road surface, the pressure-increasing time T2 for ordinary road surface, and the holding time T3 for ordinary road surface are set in accordance with the change rate (time derivative value) DDVw of the wheel acceleration DVw of the wheel** at the time when the conditions for starting the ABS control for ordinary road surface shown in the above-described Eqs. (2) and (3) are satisfied.

Notably, in the case where, due to a large increase rate of the wheel acceleration DVw of the controlled wheel after time t0, the above-mentioned time t2 (that is, the point in time at which the value of the wheel acceleration DVw of the controlled wheel changes from a negative value to a positive value) shifts to a point in time earlier than the above-mentioned time t1 (that is, the point in time after elapse of the pressure-reducing time T1 for ordinary road surface from time to), the present apparatus immediately switches the brake hydraulic pressure control mode for the controlled wheel from the pressure-reducing mode to the pressure-increasing mode at time t2, and then performs the processing of time t2 to time t8 shown in FIG. 4.

Meanwhile, in the case where, due to a small increase rate of the wheel acceleration DVw of the controlled wheel after time t0 (or due to failure of the wheel acceleration DVw to increase), the conditions for starting the ABS control for ordinary road surface shown in the above-described Eqs. (2) and (3) are still satisfied at time t1, the present apparatus resets the time such that time t1 is considered time t0, and then performs the processing of time t0 to time t8 shown in FIG. 4. With this operation, after the conditions for starting the ABS control for ordinary road surface are satisfied, the operation is continuously performed in the pressure-reducing mode over a time two times the pressure-reducing time T1 for ordinary road surface. The above is the outline of the ABS control for ordinary road surface.

<Outline of ABS Control for Low-μ Road Surface>

Next, the ABS control for low-μ road surface will be described. The main purpose of the ABS control for low-μ road surface is to restore the wheel speeds. Since the vehicle shown in FIG. 1 is of a 4WD type, all the wheels are connected with one another via the drive system. Accordingly, when excessive braking operation is performed on a low-μ road surface, all the wheels (drive wheels) tend to start slippage to a generally equal extent. That is, all the wheel speeds Vw** decrease at substantially the same gradient.

Therefore, a wheel speed difference becomes unlikely to be generated, so that the slippage amount "Vso−Vw**" of each wheel does not exceed the slippage amount reference value ΔVwrefnorm for ABS control start determination for ordinary road surface (that is, the conditions for starting the ABS control for ordinary road surface are not satisfied). As a result, ABS control is less likely to be started at proper timing. Accordingly, in such a case, the conditions for starting the ABS control for ordinary road surface must be corrected in a direction for facilitating the start of ABS control.

Further, on a low-μ road surface, even when ABS control is started, because of a small rotation moment of a speed-increasing direction, which each tire receives from the road surface, a relatively long time is required for recovery, of the rotational speed of each wheel having once dropped, to a speed corresponding to the vehicle body speed as a result of control for reducing the brake hydraulic pressure. Accordingly, in this case, in order to secure traveling stability of the vehicle, restoring the rotational speed of the wheel must precede maintaining the large deceleration.

In view of the above, in the case of the present apparatus, as described later, when the road surface on which the vehicle is traveling has been determined to (possibly) be a low-μ road surface, upon satisfaction of Eqs. (4) and (5) described below, the present apparatus starts ABS control for low-μ road surface for the wheel**. That is, the following Eqs. (4) and (5) represent (a portion of) conditions for starting the ABS control for low-μ road surface.

$$Vso-Vw^{**} > \Delta Vwreflow \quad (4)$$

$$DVw^{**} < DVwreflow \quad (5)$$

In Eq. (4), ΔVwreflow-represents a slippage amount reference value (constant, positive value) for ABS control start determination for low-μ road surface, which is smaller than the slippage amount reference value ΔVwrefnorm for ABS control start determination for ordinary road surface. In Eq. (5), DVwreflow-represents a wheel acceleration reference value (constant, negative value) for ABS control start determination for low-μ road surface, which is greater than the wheel acceleration reference value DVwrefnorm for ABS control start determination for ordinary road surface. Therefore, the conditions for starting the ABS control for low-μ road surface are less stringent than the conditions for starting the ABS control for ordinary road surface.

Figure 5:
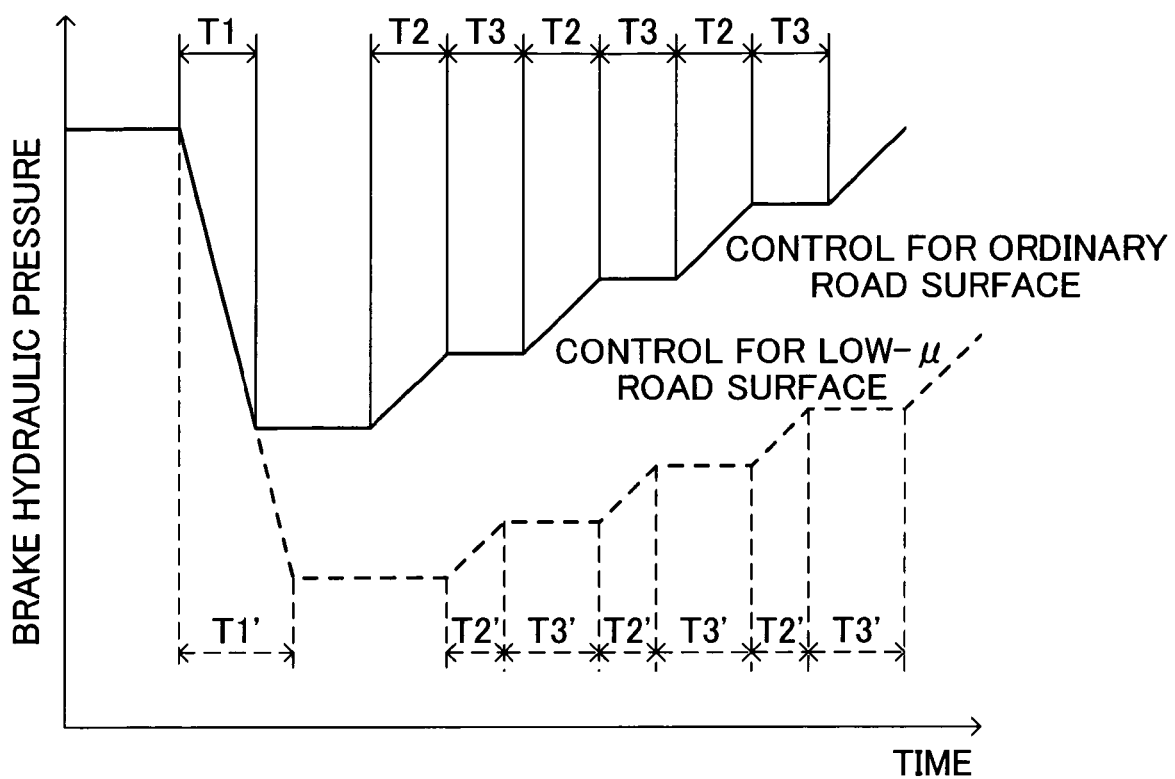
FIG. 5 is a time chart showing changes in the brake hydraulic pressure associated with a controlled wheel for which the motion control apparatus shown in FIG. 1 perform ABS control, while comparing the case in which ABS control for ordinary road surface is performed and the case in which ABS control for low-μ road surface is performed.

When the road surface on which the vehicle is traveling is determined to (possibly) be a low-μ road surface, upon satisfaction of the conditions for starting the ABS control for low-μ road surface, the present apparatus performs the ABS control for low-μ road surface, which is the same as the ABS control for ordinary road surface shown in section (b) of FIG. 4 (indicated by a solid line in FIG. 5) except that the pressure-reducing time T1 for ordinary road surface, the pressure-increasing time T2 for ordinary road surface, and the holding time T3 for ordinary road surface are replaced with a pressure-reducing time T1' for low-μ road surface, a pressure-increasing time T2' for low-μ road surface, and a holding time T3' for low-μ road surface, as indicated by a broken line in FIG. 5.

The pressure-reducing time T1' for low-μ road surface, the pressure-increasing time T2' for low-μ road surface, and the holding time T3' for low-μ road surface are set in accordance with the change rate (time derivative value) DDVw of the wheel acceleration DVw of the wheel** at the time when the conditions for starting the ABS control for low-μ road surface shown in the above-described Eqs. (4) and (5) are satisfied, and satisfy the following relations:

the pressure-reducing time T1' for low-μ road surface>the pressure-reducing time T1 for ordinary road surface;

the pressure-increasing time T2' for low-μ road surface<the pressure-increasing time T2 for ordinary road surface; and the holding time T3' for low-μ road surface>the holding time T3 for ordinary road surface.

As can be understood from FIG. 5, in the ABS control for low-μ road surface, the degree (magnitude and period of time) of decreasing the brake hydraulic pressure associated with the controlled wheel is made greater as compared to the case of the ABS control for ordinary road surface, whereby restoring the rotational speed of the wheel precedes maintaining the large deceleration. The above is the outline of the ABS control for low-μ road surface <Outline of Road Surface Determination>

Next, there will be described road surface determination; i.e., determination as to whether the road surface on which the vehicle is traveling is (possibly) a low-μ road surface. The greater the road surface friction coefficient, the smaller (the greater the absolute value of) the actual fore-aft acceleration of the vehicle body (actual vehicle body acceleration Gact (in this case, a negative value)) at the time when the wheels undergo slippage in response to the driver's braking operation.

In view of this, a proper value is set as a vehicle body acceleration reference value DVsoth for road surface determination (constant, positive value), and the road surface on which the vehicle is traveling is determined to be a low-μ road surface when an estimated vehicle body acceleration DVso (in this case, a negative value), which is obtained through time derivation of the estimated vehicle body speed Vso calculated in accordance with the above-described Eq. (1), is greater than a value "−DVsoth," and is determined to be an ordinary road surface when the estimated vehicle body acceleration DVso is equal to or smaller than the value "−DVsoth."

Figure 6:
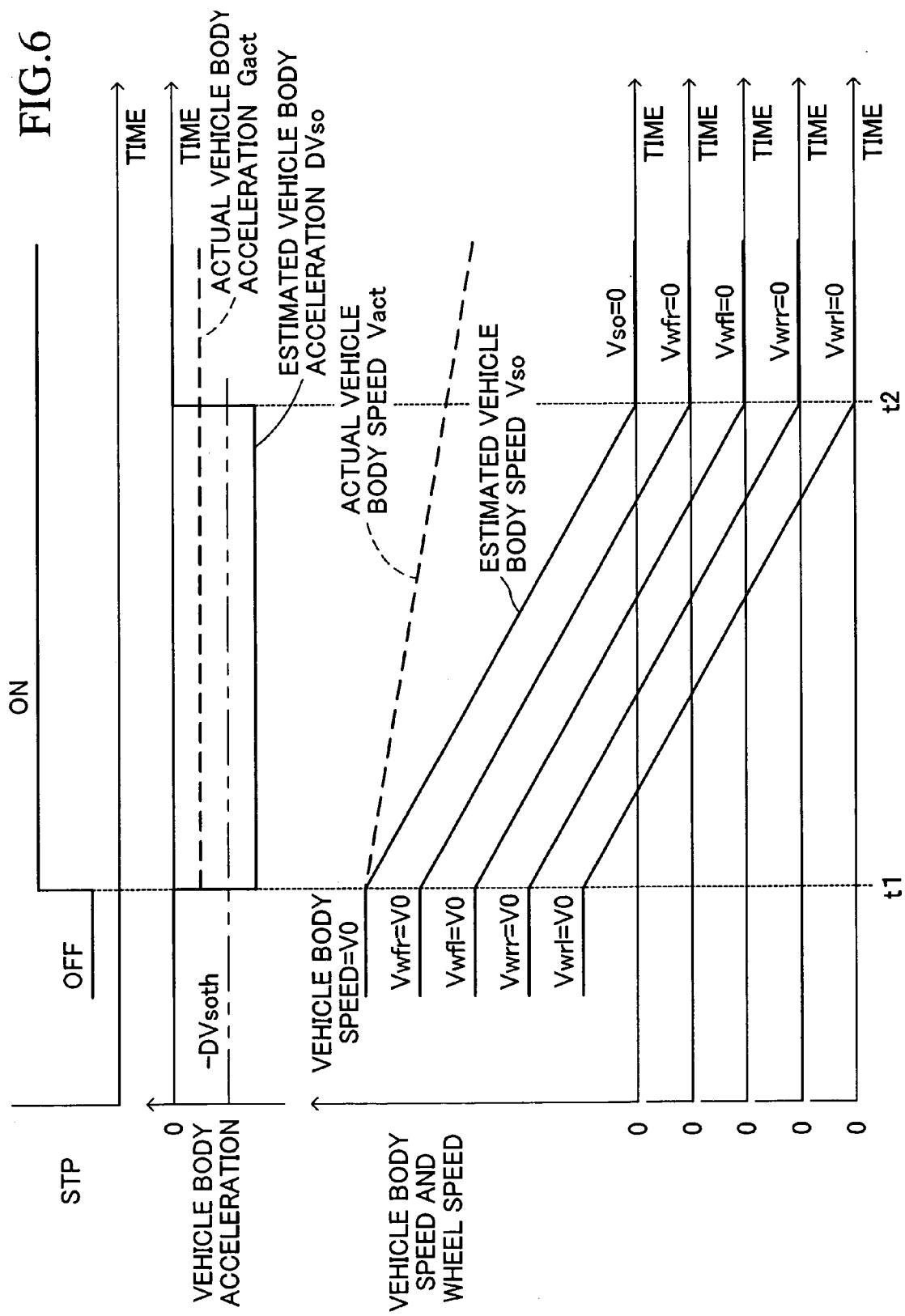
FIG. 6 is a time chart showing changes in STP signal, vehicle body acceleration, vehicle body speed, and wheel speeds when all the wheels start slipping to a generally equal extent because of driver's strong braking operation in a period during which the vehicle is going straight on a low-μ road surface.

However, in the above-described case in which all the wheels start and continue slippage to a generally equal extent in a period during which the vehicle is traveling on a low-μ road surface, in some cases the road surface determination may be erroneously performed as described below. FIG. 6 is a time chart showing example changes in the STP signal, vehicle body acceleration, vehicle body speed, and wheel speeds when a driver starts to operate the brake pedal BP at time t1 during a period during which the vehicle is going straight on a low-μ road surface at a vehicle body speed V0 (that is, Vw**=V0).

As shown in FIG. 6, in this example, all the wheels start slippage to a generally equal extent at time t1, and as a result, all the wheel speeds Vw** decrease from V0 at substantially the same gradient and become zero at time t2. Notably, the vehicle moves (advances) after time t2.

In this case, after time t1, a difference is produced between the maximum wheel speed max(Vw) and the actual speed of the vehicle body (actual vehicle body speed Vact). As a result, the variation gradient of the estimated vehicle body speed Vso, which is periodically calculated as a value that is, in principle, equal to the maximum wheel speed max(Vw) (that is, the estimated vehicle body acceleration DVso (negative value)), can become smaller than the variation gradient of the actual vehicle body speed Vact (that is, the actual vehicle body acceleration Gact (negative value)).

As a result, as shown in FIG. 6, even when the actual vehicle body acceleration Gact is greater than the value "−DVsoth," there is a possibility that the estimated vehicle body acceleration DVso is calculated as a value not greater than the value "−DVsoth." In such a case, even if the vehicle is traveling on a low-μ road surface, the road surface is erroneously determined to be an ordinary road surface. As described above, such erroneous determination occurs because of presence of cases in which estimation accuracy of the estimated vehicle body acceleration DVso is low.

Incidentally, the magnitude of the actual vehicle body acceleration Gact can be accurately estimated on the basis of changes in tire pressures. That is, when a driver starts braking operation, an inertial force corresponding to the actual vehicle body acceleration Gact acts on the vehicle body toward the front thereof. Accordingly, immediately after start of the braking operation, the tire pressures of the front wheels of the vehicle increase in accordance with the magnitude of the inertial force, and the tire pressures of the rear wheels of the vehicle decrease in accordance with the magnitude of the inertial force. Accordingly, the change amount (variation gradient) of the tire pressures of the front wheels of the vehicle or the change amount (variation gradient) of the tire pressures of the rear wheels of the vehicle serves as a value accurately representing the magnitude of the actual vehicle body acceleration Gact.

In view of the above, the present apparatus performs the determination as to whether the actual vehicle body acceleration Gact (in this case, negative value) is greater than the value "−DVsoth," through use of changes in the tire pressures in place of the above-mentioned estimated vehicle body acceleration DVso.

Specifically, the present apparatus sets a tire pressure change amount reference value ΔPthabs (constant, positive value) for road surface determination, which corresponds to the above-mentioned vehicle body acceleration reference value DVsoth for road surface determination. The present apparatus then determines the road surface on which the vehicle is traveling to be an ordinary road surface when the tire pressure change amount of the front wheels of the vehicle (in the present example, the average of ΔPfr and ΔPfl (average front tire pressure change amount ΔPfrmean)) is greater than ΔPthabs, or when the tire pressure change amount of the rear wheels of the vehicle (in the present example, the average of ΔPrr and ΔPrl (average rear tire pressure change amount ΔPremean)) is smaller than the value "−ΔPthabs." In this case, ABS control start determination is performed in accordance with the conditions for starting the ABS control for ordinary road surface based on the above-described Eqs. (2) and (3), and when the conditions are satisfied, the ABS control for ordinary road surface is started and performed.

Meanwhile, when the average front tire pressure change amount ΔPfrmean is equal to or less than ΔPthabs, and the average rear tire pressure change amount ΔPremean is equal to or greater than the value "−ΔPthabs," the present apparatus determines that the road surface on which the vehicle is traveling is (possibly) a low-μ road surface. In this case, ABS control start determination is performed in accordance with the conditions for starting the ABS control for low-μ road surface based on the above-described Eqs. (4) and (5), and when the conditions are satisfied, the ABS control for low-μ road surface is started and performed.

Notably, even in the case where a driver performs light braking operation which does not cause the tendency of wheel locking in a period during which the vehicle is traveling on an ordinary road surface, both the inequalities "the average front tire pressure change amount ΔPformean≦ΔPthabs" and "the average rear tire pressure change amount ΔPremean≧−ΔPthabs" are satisfied, and as a result, the surface is determined to (possibly) be a low-μ road surface. However, in this case, since the tendency of wheel locking has not occurred, the above-mentioned conditions for starting the ABS control for low-μ road surface are not satisfied, with a result that the ABS control for low-μ road surface is not started in a period during which the vehicle is traveling on an ordinary road surface.

As described above, the present apparatus estimates the state of acceleration of the vehicle in the fore-aft direction of the vehicle body on the basis of the average front tire pressure change amount ΔPfrmean and the average rear tire pressure change amount ΔPremean, which serves as a "value representing fore-aft acceleration," and performs road surface determination on the basis of the results of the estimation. The above is the outline of the ABS control performed by the present apparatus.

Actual Operation

The actual operation of the motion control apparatus 10, which includes the motion state estimation apparatus according to the present invention having the above-described structure, will be explained while referring to FIGS. 7 to 12, which show, in the form of flowcharts, routines which are executed by the CPU 51 of the electronic controller 50. Notably, the flowchart shown in FIG. 8 corresponds to the motion state estimation means for estimating the state of turning of the vehicle on the basis of the "value representing lateral acceleration," and the flowchart shown in FIG. 10 corresponds to the motion state estimation means for estimating the state of acceleration of the vehicle in the fore-aft direction of the vehicle body on the basis of the "value representing fore-aft acceleration."

Figure 7:
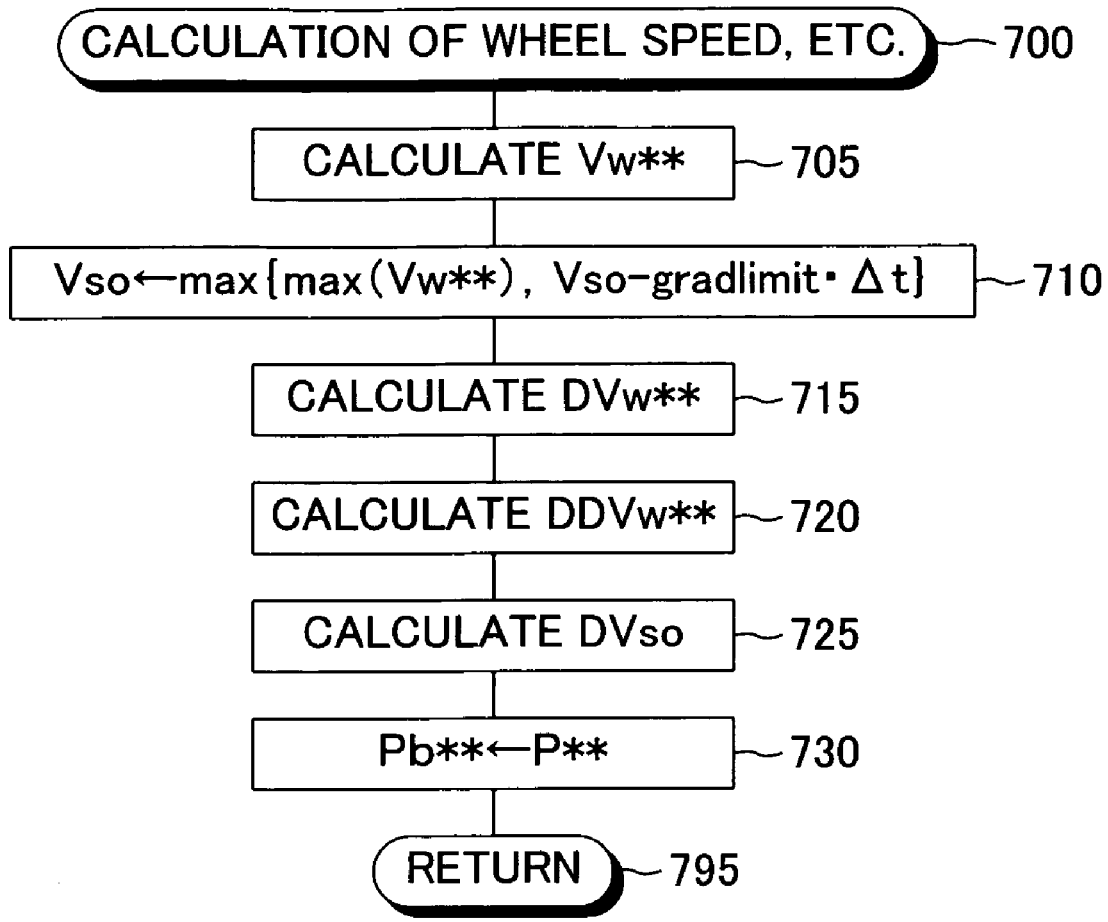
FIG. 7 is a flowchart showing a routine which the CPU shown in FIG. 1 executes in order to calculate wheel speed and other parameters.

At predetermined time intervals (e.g., 6 msec), the CPU 51 repeatedly performs a routine shown in FIG. 7 for calculating wheel speeds, etc. Accordingly, when a predetermined timing is reached, the CPU 51 starts processing of the routine from Step 700, and proceeds to Step 705 so as to calculate the wheel speed Vw of the wheel (the speed of the outer periphery of the tire of the wheel). Specifically, the CPU 51 calculates the wheel speed Vw on the basis of the frequency of the waveform of the signal output from the wheel speed sensor 41**.

Next, the CPU 51 proceeds to Step 710 and calculates a present estimated vehicle body speed Vso on the basis of the wheel speed Vw and a previous estimated vehicle body speed Vso, which was calculated in Step 710 during the previous execution of the present routine, and in accordance with the above-described Eq. (1). Subsequently, the CPU 51 proceeds to Step 715 so as to calculate, for each wheel, a wheel acceleration DVw, which is a time derivative of the wheel speed Vw, in accordance with Eq. (6) described below. In Eq. (6), Vwb represents the previous wheel speed Vw**, which was calculated in Step 705 during the previous execution of the present routine, and Δt represents the above-described, predetermined intervals (the execution period of the present routine of the CPU 51).

$$DVw^{} = (Vw^{} - Vwb^{**})/\Delta t \qquad \text{Eq. (6)}$$

Next, the CPU 51 proceeds to Step 720 so as to calculate, for each wheel, a change rate DDVw of the wheel acceleration DVw in accordance with Eq. (7) described below. In Eq. (7), DVwb represents the previous wheel acceleration DVw, which was calculated in Step 715 during the previous execution of the present routine.

$$DDVw^{} = (DVw^{} - DVwb^{**})/\Delta t \qquad \text{Eq. (7)}$$

Subsequently, the CPU 51 proceeds to Step 725 so as to calculate an estimated vehicle body acceleration DVso, which is a time derivation of the estimated vehicle body speed Vso, in accordance with Eq. (8) described below. In Eq. (8), Vsob represents the previous estimated vehicle body speed Vso, which was calculated in Step 710 during the previous execution of the present routine.

$$DVso=(Vso-Vsob)/\Delta t \qquad \text{Eq. (8)}$$

After that, the CPU 51 proceeds to Step 730 so as to store, as previous tire pressure Pb, a tire pressure P at the present point in time, which is detected by means of the tire pressure sensor 43\*\*, and then proceeds to Step 795 so as to end the current execution of the present routine. After that, the CPU 51 repeatedly executes the present routine.

Next, operation for performing determination on start and end of the BFD control will be described. The CPU 51 repeatedly performs a routine shown in FIG. 8 at predetermined time intervals (e.g., 6 msec). Accordingly, when a predetermined timing is reached, the CPU 51 starts processing of the routine from Step 800, and proceeds to Step 805 so as to determine whether the value of a BFD control execution flag BFD is "0." The BFD control execution flag BFD represents that the BFD control is currently performed, when its value is "1," and represents that the BFD control is not currently performed, when its value is "0."

Here, the BFD control is assumed not to be currently performed. In this case, the CPU 51 makes a "Yes" determination in Step 805, and then proceeds to Step 810 so as to determine whether the STP signal is at the ON level (that is, whether the driver is performing braking operation). When the CPU 51 makes a "Yes" determination in Step 810, the CPU 51 proceeds to Step 815 so as to determine whether the estimated vehicle body Vso calculated in the previously described step 710 is equal to or greater than a predetermined vehicle speed Vsoth.

When the CPU 51 makes a "Yes" determination in Step 815, the CPU 51 proceeds to Step 820 so as to calculate, for each wheel, a tire pressure change amount ΔP from the tire pressure P at the present point in time detected by means of the tire pressure sensor 43\*\* and the previous tire pressure Pb stored in the previously described step 730**.

Subsequently, the CPU 51 proceeds to Step 825 so as to obtain the above-mentioned average right-hand tire pressure change amount ΔPrimean, which is the average of the tire pressure change amounts ΔPfr and ΔPrr of the right-hand wheels of the vehicle obtained in Step 820, and then proceeds to Step 830 so as to obtain the above-mentioned average left-hand tire pressure change amount ΔPlemean in the same manner as in Step 825.

Next, the CPU 51 proceeds to Step 835 so as to determine whether the average right-hand tire pressure change amount ΔPrimean is greater than the above-mentioned BFD control start determination reference value ΔPthbfd, and the average left-hand tire pressure change amount ΔPlemean is smaller than the value "−ΔPthbfd." When the CPU 51 makes a "Yes" determination in Step 835, the CPU 51 sets the value of a turning flag LEFT to "1" in Step 840, and then proceeds to Step 855. The turning flag LEFT represents that the vehicle is turning to the left when its value is "1," and represents that the vehicle is turning to the right when its value is "0."

Meanwhile, when the CPU 51 makes a "No" determination in Step 835, the CPU 51 proceeds to Step 845 so as to determine whether the average right-hand tire pressure change amount ΔPrimean is smaller than the value "−ΔPthbfd," and the average left-hand tire pressure change amount ΔPlemean is greater than the value ΔPthbfd. When the CPU 51 makes a "Yes" determination in Step 845, the CPU 51 sets the value of the turning flag LEFT to "0" in Step 850, and then proceeds to Step 855.

In Step 855, the CPU 51 changes the value of the BFD control execution flag BFD from "0" to "1." After that, the CPU 51 proceeds to Step 895 so as to end the current execution of the present routine. When the value of the BFD control execution flag BFD is set to "1," a BFD control corresponding to the turning direction represented by the value of the turning flag LEFT is started by a routine to be described later.

The AND conditions composed of Steps 810, 815, and 835 correspond to the "conditions for starting the BFD control when the vehicle is turning to the left," and the AND conditions composed of Steps 810, 815, and 845 correspond to the "conditions for starting the BFD control when the vehicle is turning to the right."

Meanwhile, when the conditions for starting the BFD control are not satisfied (that is, when a "No" determination is made in any of Steps 810, 815, and 845), the CPU 51 proceeds directly to Step 895 so as to end the current execution of the present routine. In this case, the value of the BFD control execution flag BFD is maintained at "0," and therefore, the BFD control is not started. After that, so long as the conditions for starting the BFD control are not satisfied, the CPU 51 makes a "No" determination in any of Steps 810, 815, and 845, with the result that the value of the BFD control execution flag BFD is maintained at "0."

Next, the case where the conditions for starting the BFD control have been satisfied will be described. In this case, since the value of the BFD control execution flag BFD has been changed to "1," the CPU 51 makes a "No" determination when it proceeds to Step 805, and then proceeds to Step 865 so as to determine whether the STP signal is at the OFF level (that is, the driver's braking operation has ended) or an ABS control execution flag ABS to be described later is "1" (that is, ABS control is currently performed for the wheel). When the CPU 51 makes a "Yes" determination in Step 865, the CPU 51 proceeds to Step 870 so as to change the value of the BFD control execution flag BFD from "1" to "0."

As a result, the BFD control is ended by the routine to be described later. That is, when ABS control is started in a period during which the BFD control is being performed, the BFD control currently performed ends. In other words, ABS control is performed preferentially over the BFD control. As is apparent from the above, the condition of Step 865 corresponds to the "conditions for ending the BFD control."

Meanwhile, when the CPU 51 makes a "No" determination in Step 865, the CPU 51 proceeds directly to Step 895 so as to end the current execution of the present routine. In this case, the value of the BFD control execution flag BFD is maintained at "1," and therefore, the BFD control currently performed is continued. After that, so long as the conditions for ending the BFD control are not satisfied, the CPU 51 repeatedly executes the processing of 805 and 865, with the result that the value of the BFD control execution flag BFD is maintained at "1."

Next, operation for performing the BFD control will be described. The CPU 51 repeatedly performs a routine shown in FIG. 9 at predetermined time intervals (e.g., 6 msec). Accordingly, when a predetermined timing is reached, the CPU 51 starts processing of the routine from Step 900, and proceeds to Step 905 so as to determine whether the value of the BFD control execution flag BFD is "1."

Here, the present point in time is assumed to be immediately after execution of the processing of the previously described Step 855 (that is, immediately after the conditions for starting the BFD control have been satisfied). In this case, the CPU 51 makes a "Yes" determination in Step 905, and then proceeds to Step 910 so as to determine whether the value of the turning flag LEFT is "1." When the CPU 51 makes a "Yes" determination in Step 910, the CPU 51 proceeds to Step 915 so as to bring into an excited state (closed state) only the pressure-increasing valve PUrl associated with the rear left wheel RL, which corresponds to the rear wheel located on the inner side of a turning locus, and then proceeds to Step 995 so as to end the current execution of the present routine. With this operation, the brake hydraulic pressure within the wheel cylinder Wrl of the rear left wheel RL is held, so that the BFD control for left turn is performed.

When the CPU 51 makes a "No" determination in Step 910, the CPU 51 proceeds to Step 920 so as to bring into an excited state (closed state) only the pressure-increasing valve PUrr associated with the rear right wheel RR, which corresponds to the rear wheel located on the inner side of the turning locus. With this operation, the brake hydraulic pressure within the wheel cylinder Wrr of the rear right wheel RR is held, so that the BFD control for right turn is performed.

After that, so long as the value of the BFD control execution flag BFD is maintained at "1," the CPU 51 repeats an operation of making a "Yes" determination in Step 905 and then executing the processing of Step 915 or Step 920, whereby the BFD control is continued.

Here, the processing of the previously described Step 870 is assumed to be executed in this state (accordingly, the present point in time is assumed to be immediately after the conditions for ending the BFD control have been satisfied). In this case, the CPU 51 makes a "No" determination in Step 905 and then proceeds to Step 925 so as to end the BFD control by bringing into an unexcited state the pressure-increasing valve PUr* which is in the excited state and corresponds to the rear wheel located on the inner side of the turning locus.

After that, so long as the value of the BFD control execution flag is maintained at "0," the CPU 51 repeats an operation of making a "No" determination in Step 905 and then executing the processing of Step 925, whereby the state in which the BFD control is not performed is continued.

Next, operation for selecting an ABS control pattern will be described. The CPU 51 repeatedly performs a routine shown in FIG. 10 at predetermined time intervals (e.g., 6 msec). Accordingly, when a predetermined timing is reached, the CPU 51 starts processing of the routine from Step 1000, and proceeds to Step 1005 so as to determine whether the value of the ABS control execution flag ABS for the wheel is "0."

As will be described later, the ABS control execution flag ABS represents that the ABS control is currently performed (whether it is for ordinary road surface or low-µ road surface) when its value is "1," and represents that the ABS control is not currently performed when its value is "0."

Here, the ABS control is assumed not to be performed for the wheel. In this case, the CPU 51 makes a "Yes" determination in Step 1005, and then proceeds to Step 1010 so as to determine whether the estimated vehicle body acceleration DVso calculated in the previously described Step 725 is greater than the value "−DVsoth." When the CPU 51 makes a "Yes" determination in Step 1010, the CPU 51 sets the value of a low-µ determination flag LOW to "1" in Step 1015, and then proceeds to Step 1095** so as to end the current execution of the present routine.

The low-µ determination flag LOW represents that a road surface on which the vehicle is traveling is (possibly) a low-µ road surface when its value is "1," and represents that the road surface on which the vehicle is traveling is an ordinary road surface when its value is "0."

Notably, in the case where a "Yes" determination is made in Step 1010 (that is, LOW is set to "1"), the actual vehicle body acceleration Gact (in this case, a negative value) does not become equal to or lower than the value "−DVsoth" in a period during which the driver is performing braking operation. Accordingly, under the assumption that the tendency of wheel locking has occurred, the vehicle is traveling on a low-µ road surface.

Also, the cases in which a "Yes" determination is made in Step 1010 include the case where the driver performs light braking operation which does not cause a tendency of wheel locking in a period during which the vehicle is traveling on an ordinary road surface. However, in this case, since the tendency of wheel locking has not occurred, the conditions for starting the ABS control for low-µ road surface are not satisfied in a routine to be descried later, so that the ABS control for low-µ road surface is not started in a period during which the vehicle is traveling on an ordinary road surface.

Meanwhile, when the CPU 51 makes a "No" determination in Step 1010 (that is, when the estimated vehicle body acceleration DVso (in this case, a negative value) is equal to or smaller than the value "−DVsoth"), the CPU 51 proceeds to Step 1020. Notably, the cases in which a "No" determination in Step 1010 include the case where the vehicle is traveling on an ordinary road surface, and a tendency of wheel locking has occurred in a state in which the actual vehicle body acceleration Gact (in this case, a negative value) is equal to or lower than the value "−DVsoth" in a period during which the driver is performing braking operation, and the case shown in FIG. 6 in which the vehicle is traveling on a low-µ road surface, and a tendency of wheel locking has occurred in all the wheels to a generally equal extent in a state in which the actual vehicle body acceleration Gact (in this case, a negative value) is greater than the value "−DVsoth" in a period during which the driver is performing braking operation.

When the CPU 51 proceeds to Step 1020, it calculates, for each wheel, a tire pressure change amount ΔP from the tire pressure P at the present point in time detected by means of the tire pressure sensor 43 and the previous tire pressure Pb stored in the previously described step 730.

Subsequently, the CPU 51 proceeds to Step 1025 so as to obtain the above-mentioned average front tire pressure change amount ΔPfrmean, which is the average of the tire pressure change amounts ΔPfr and ΔPfl of the front wheels of the vehicle obtained in Step 1020, and then proceeds to Step 1030 so as to obtain the above-mentioned average rear tire pressure change amount ΔPremean in the same manner as in Step 1025.

Next, the CPU 51 proceeds to Step 1035 so as to determine whether the average front tire pressure change amount ΔPfrmean is greater than the above-mentioned tire pressure change amount reference value ΔPthabs for road surface determination, or the average rear tire pressure change amount ΔPremean is smaller than the value "−ΔPthabs." When the CPU 51 makes a "No" determination in Step 1035, the CPU 51 proceeds to the previously described Step 1015 so as to set the value of the low-µ determination flag LOW to "1." This case corresponds to the case where a tendency of wheel locking occurs in all the wheels to a generally equal extent in a state the actual vehicle body acceleration Gact (in this case, a negative value) is greater than the value "−DVsoth" in a period during which the vehicle is traveling on a low-µ road surface.

Meanwhile, when the CPU 51 makes a "Yes" determination in Step 1035, the CPU 51 proceeds to Step 1040 so as to set the value of the low-µ determination flag LOW to "0." This case corresponds to the case where the actual vehicle body acceleration Gact (in this case, a negative value) is equal to or lower than the value "−DVsoth" in a period during which the vehicle is traveling on an ordinary road surface.

After that, so long as the value of the ABS control execution flag ABS for the wheel is "0," the CPU 51 repeats the above-described processing. As a result, the road surface on which the vehicle is traveling is periodically determined to possibly be a low-μ road surface or an ordinary road surface.

When the value of the ABS control execution flag ABS for the wheel is changed from "0" to "1" by a routine to be described later (that is, when the conditions for starting the ABS control are satisfied form the wheel**), the CPU 51 repeats an operation of making a "No" determination in Step 1005 and proceeding to Step 1095 so as to end the current execution of the present routine.

Next, operation for performing determination on start of the ABS control will be described. The CPU 51 repeatedly performs a routine shown in FIG. 11 at predetermined time intervals (e.g., 6 msec). Accordingly, when a predetermined timing is reached, the CPU 51 starts processing of the routine from Step 1100, and proceeds to Step 1105 so as to determine whether the STP signal is at the ON level and the value of the ABS control execution flag ABS** is "0." When the CPU 51 makes a "No" determination in Step 1105, the CPU 51 proceeds directly to Step 1195 so as to end the current execution of the present routine.

Here, it is assumed that the driver is operating the bake pedal BP, the ABS control is not performed for the wheel, and the value of the low-μ determination flag LOW is "0." In this case, the CPU 51 makes a "Yes" determination in Step 1105, and then proceeds to Step 1110 so as to determine whether the value of the low-μ determination flag LOWE is "0."

At the present point in time, since the value of the low-μ determination flag LOW is "0," the CPU 51 makes a "Yes" determination in Step 1110, and proceeds to Step 1115 so as to store, as a slippage amount reference value ΔVwref for ABS control start determination for the wheel, the above-described slippage amount reference value ΔVwrefnorm for ABS control start determination for ordinary road surface, and store, as a wheel acceleration reference value DVwref for ABS control start determination for the wheel**, the above-described wheel acceleration reference value DVwrefnorm for ABS control start determination for ordinary road surface.

Next, the CPU 51 proceeds to Step 1120 so as to determine, for each wheel, whether the ABS control start conditions (at the present point in time, the conditions for starting the ABS control for ordinary road surface) are satisfied for the wheel** in accordance with the equations described in the box of Step 1120 and corresponding to the above-described Eqs. (2) and (3). When the CPU 51 makes a "No" determination in Step 1120, the CPU 51 proceeds directly to Step 1195 so as to end the current execution of the present routine.

Meanwhile, when the conditions for starting the ABS control (for ordinary road surface) are satisfied for the wheel**, the CPU 51 makes a "Yes" determination in Step 1120, and proceeds to Step 1125 so as to determine whether the low-μ determination flag LOWE is "0." In this assumed case, the CPU 51 makes a "Yes" determination in Step 1125, and then proceeds to Step 1130.

In Step 1130, the CPU 51 stores, as a pressure-reducing time T1 for the wheel, a pressure-increasing time T2 for the wheel, and a holding time T3 for the wheel, the values of the above-described pressure-reducing time T1, pressure-increasing time T2, and the holding time T3 for ordinary road surface, which are set in accordance with the change rate DDVw of the wheel acceleration of the wheel calculated in the previously described Step 720.

Subsequently, the CPU 51 proceeds to Step 1135 so as to reset a passage time T, which represents the passage of time after the conditions for starting the ABS control for the wheel are satisfied, and then proceeds to Step 1140 so as to change the value of the ABS control execution flag ABS for the wheel from "0" to "1." After that, the CPU 51 proceeds to Step 1195 so as to end the current execution of the present routine. Notably, the passage time T** is obtained for each wheel on the basis of the output of an unillustrated timer contained in the electronic controller 50.

As a result, the value of the ABS control execution flag ABS is changed to and maintained at "1." Therefore, after this point in time, the CPU 51 repeats an operation of making a "No" determination for the wheel (the wheel for which the value of the ABS control execution flag ABS** is set to "1") in Step 1105 and proceeding directly to Step 1195 so as to end the current execution of the present routine.

Meanwhile, in the case where the driver is operating the bake pedal BP, the ABS control is not performed for the wheel, and the value of the low-μ determination flag LOW is "1," the CPU 51 makes a "No" determination when it proceeds to Step 1110, and then proceeds to Step 1145 so as to store, as a slippage amount reference value ΔVwref for ABS control start determination for the wheel, the above-described slippage amount reference value ΔVwreflow-for ABS control start determination for low-μ road surface, and store, as a wheel acceleration reference value DVwref for ABS control start determination for the wheel, the above-described wheel acceleration reference value DVwreflow-for ABS control start determination for low-μ road surface.

That is, in Step 1120 subsequent thereto, the CPU 51 determine, for each wheel, whether the ABS control start conditions (at the present point in time, the conditions for starting the ABS control for low-μ road surface) are satisfied for the wheel** in accordance with the equations described in the box of Step 1120 and corresponding to the above-described Eqs. (4) and (5).

When the conditions for starting the ABS control (for low-μ road surface) are satisfied for the wheel, the CPU 51 makes a "No" determination in Step 1125, and then proceeds to Step 1150. In Step 1150, the CPU 51 stores, as a pressure-reducing time T1 for the wheel, a pressure-increasing time T2 for the wheel, and a holding time T3 for the wheel, the values of the above-described pressure-reducing time T1', pressure-increasing time T2', and the holding time T3' for low-μ road surface, which are set in accordance with the change rate DDVw of the wheel acceleration of the wheel** calculated in the previously described Step 720. After that, the CPU 51 proceeds via Steps 1135 and 1140 to Step 1195 so as to end the current execution of the present routine.

As described above, the ABS control start conditions, the pressure-reducing time T1, the pressure-increasing time T2, and the holding time T3 are set in accordance with the value of the low-μ determination flag LOW so as to be used for the case of ordinary road surface or the case of low-μ road surface. In the above-described manner, the ABS control start determination is performed.

Figure 12:
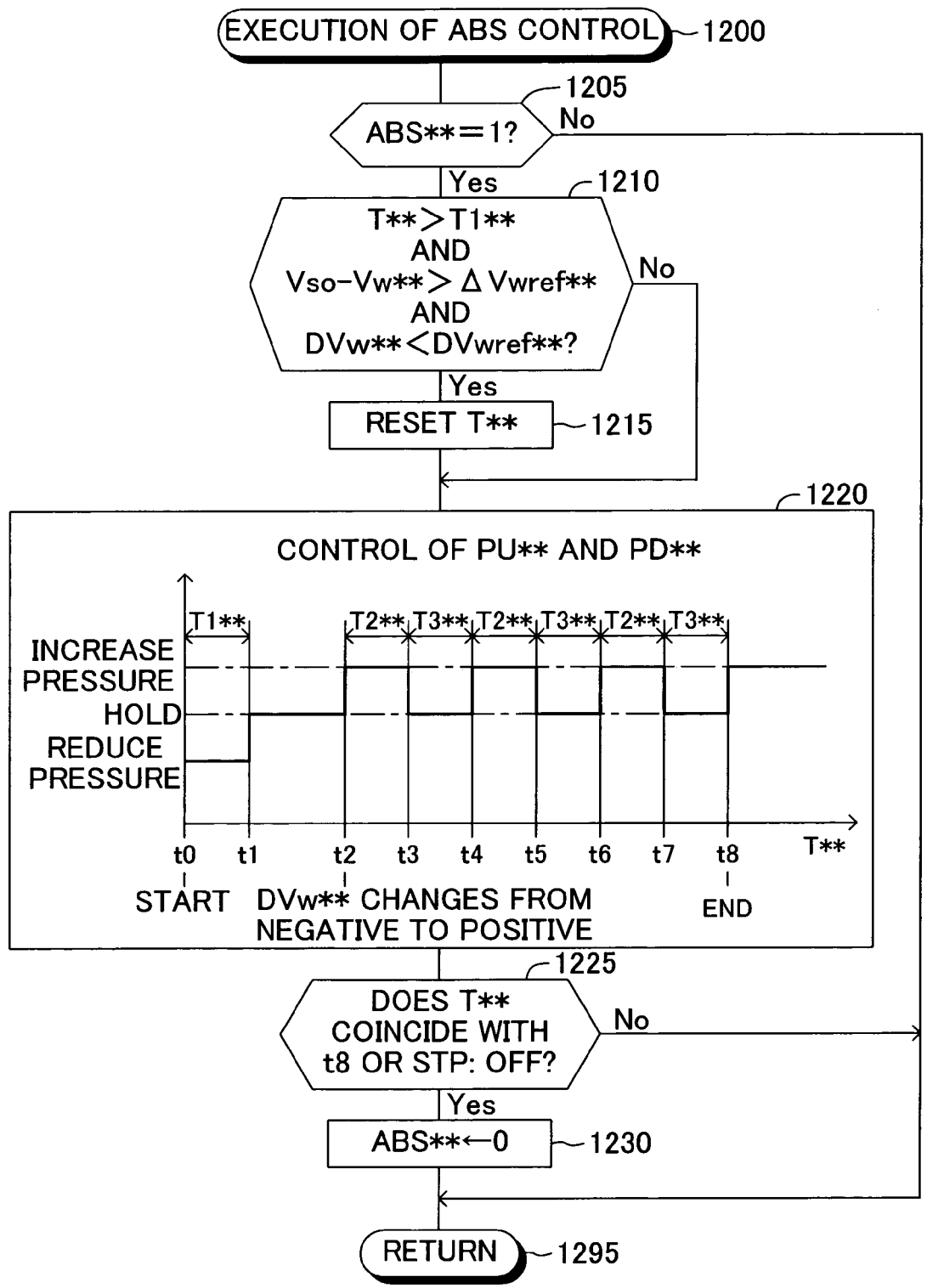
FIG. 12 is a flowchart showing a routine which the CPU shown in FIG. 1 executes in order to perform the ABS control.

Further, at predetermined intervals, the CPU 51 repeatedly executes a routine shown in FIG. 12 for performing ABS control. Accordingly, when a predetermined timing is reached, the CPU 51 starts processing of the routine from Step 1200, and proceeds to Step 1205 so as to determine whether the value of the ABS control execution flag ABS** is "1." For the wheel for which the CPU 51 makes a "No"

determination, the CPU 51 proceeds directly to Step 1295 so as to end the current execution of the present routine.

Here, it is assumed that the ABS control start conditions for the wheel shown in the box of the previously described Step 1120 are satisfied, the present point in time is immediately after the processing of Step 1140 for the wheel is executed, and the driver's braking operation continues. In this case, the CPU 51 makes a "Yes" determination for the wheel in Step 1205, and then proceeds to Step 1210 so as to determine whether the condition "the passage time T has exceeded the pressure-reducing time T1 set in the previously described Step 1130**" is satisfied in addition to the ABS control start conditions.

Since the present point in time is immediately after the ABS control start conditions for the wheel have been satisfied, the passage time T has not yet exceeded the pressure-reducing time T1. Accordingly, the CPU 51 makes a "No" determination in Step 1210, and then proceeds directly to Step 1220**.

Notably, when the CPU 51 makes a "Yes" determination in Step 1210, the CPU 51 resets the passage time T in Step 1215, and then proceeds to Step 1220. This processing corresponds to the above-described processing which is performed "when the conditions for starting the ABS control for ordinary road surface, which are shown in the above-described Eqs. (2) and (3), are still satisfied even at time t1 shown in FIG. 4**."

In Step 1220, the CPU 51 sets the brake hydraulic pressure control mode for the wheel (controlled wheel) in accordance with the passage time T, by controlling the pressure-increasing valve PU and the pressure-reducing valve PD for the wheel in accordance with the passage time T at the present point in time, the pressure-reducing time T1, the pressure-increasing time T2, and the holding time T3, which have been set in Sep 1130, and the time chart illustrated in the box of Step 1220, which corresponds to the time chart regarding the brake hydraulic pressure control mode shown in section (a) of FIG. 4**.

Subsequently, the CPU 51 proceeds to Step 1225 so as to determine whether the passage time T for the wheel (controlled wheel) coincides with a time corresponding to time t8 shown in the box of Step 1220 (that is, whether the ABS control (a single cycle thereof) for the wheel has ended) or the STP signal is at the OFF level. At the present point in time, the passage time T has not yet reached the time corresponding to time t8 and the driver continues the braking operation. Therefore, the CPU 51 makes a "No" determination in Step 1225, and then proceeds directly to Step 1295 so as to end the current execution of the present routine.

After that, the CPU 51 repeatedly executes the processing of Steps 1200, 1205, 1210, (1215), 1220, 1225, and 1295, until the passage time T reaches the time corresponding to time t8 or the driver ends the braking operation. With this operation, the brake hydraulic pressure control mode for the wheel is changed with the increasing passage time T**.

When the passage time T reaches the time corresponding to time t8 after elapse of a predetermined time or the driver ends the braking operation, the CPU 51 makes a "Yes" determination when it proceeds to Step 1225, and then proceeds to Step 1230 so as to change the value of the ABS control execution flag ABS from "1" to "0." After that, the CPU 51 proceeds to Step 1295 so as to end the current execution of the present routine.

Since the value of the ABS control execution flag ABS is set to "0," after that, the CPU 51 repeats an operation of making a "No" determination for the wheel in Step 1205 and proceeding directly to Step 1295 so as to end the current execution of the present routine. In this manner, the ABS control is performed in accordance with the ABS control pattern selected by the routine of FIG. 10.

As described above, according to the motion state estimation apparatus according to the embodiment of the present invention, the state of turning of the vehicle is estimated through use of the fact that changes in the tire pressures of the right-hand wheels of the vehicle and changes in the tire pressures of the left-hand wheels of the vehicle (the average right-hand tire pressure change amount ΔPrimean and the average left-hand tire pressure change amount ΔPlemean) can serve as values which accurately represent the magnitude and direction of a lateral acceleration of the vehicle; and the state of acceleration of the vehicle in the fore-aft direction of the vehicle body is estimated through use of the fact that changes in the tire pressures of the front wheels of the vehicle and changes in the tire pressures of the rear wheels of the vehicle (the average front tire pressure change amount ΔPfrmean and the average rear tire pressure change amount ΔPremean) can serve as values which accurately represent the magnitude and direction of a fore-aft acceleration of the vehicle. Accordingly, the state of acceleration of the vehicle, and accordingly, the motion state of the vehicle can be accurately estimated without use of expensive acceleration sensors.

Further, the motion control apparatus according to the embodiment of the present invention utilizing the results of estimation by the motion state estimation apparatus according to the embodiment of the present invention performs the braking force distribution control (BFD control) on the basis of the estimated state of turning of the vehicle. Accordingly, the BFD control can be properly performed on the basis of the results of accurate estimation regarding the state of turning of the vehicle.

Moreover, the motion control apparatus according to the embodiment of the present invention performs the road surface determination (determination as to whether a road surface is an ordinary road surface or a low-μ road surface) on the basis of the estimated state of acceleration of the vehicle in the fore-aft direction of the vehicle body, and selectively performs the antiskid control (ABS control) for ordinary road surface or the ABS control for low-μ road surface on the basis of the results of the determination. Accordingly, the road surface determination can be accurately performed on the basis of the results of accurate estimation regarding the state of acceleration of the vehicle in the fore-aft direction of the vehicle body, and accordingly, the ABS control can be performed in a proper ABS control mode corresponding to the road surface on which the vehicle is traveling.

The present invention is not limited to the above-described embodiment, and various modifications can be employed within the scope of the present invention. For example, in the above-described embodiment, pressure sensors (tire pressure sensors 43\*\*) for directly detecting the corresponding tire pressures are used as the tire pressure obtaining means. However, there can be used a well known apparatus which indirectly obtaining the tire pressure of each wheel on the basis of the resonance frequency of the unsprung mass of the vehicle, which is extracted from an output signal of a wheel speed sensor (e.g., a magnetic pickup type (coil type) wheel speed sensor 41\*\*) capable of outputting a signal including a component of the vibration frequency of the corresponding tire. An example of such a known apparatus is described in detail in Japanese Patent Application Laid-Open (kokai) No. H5-133831.

Figure 8:
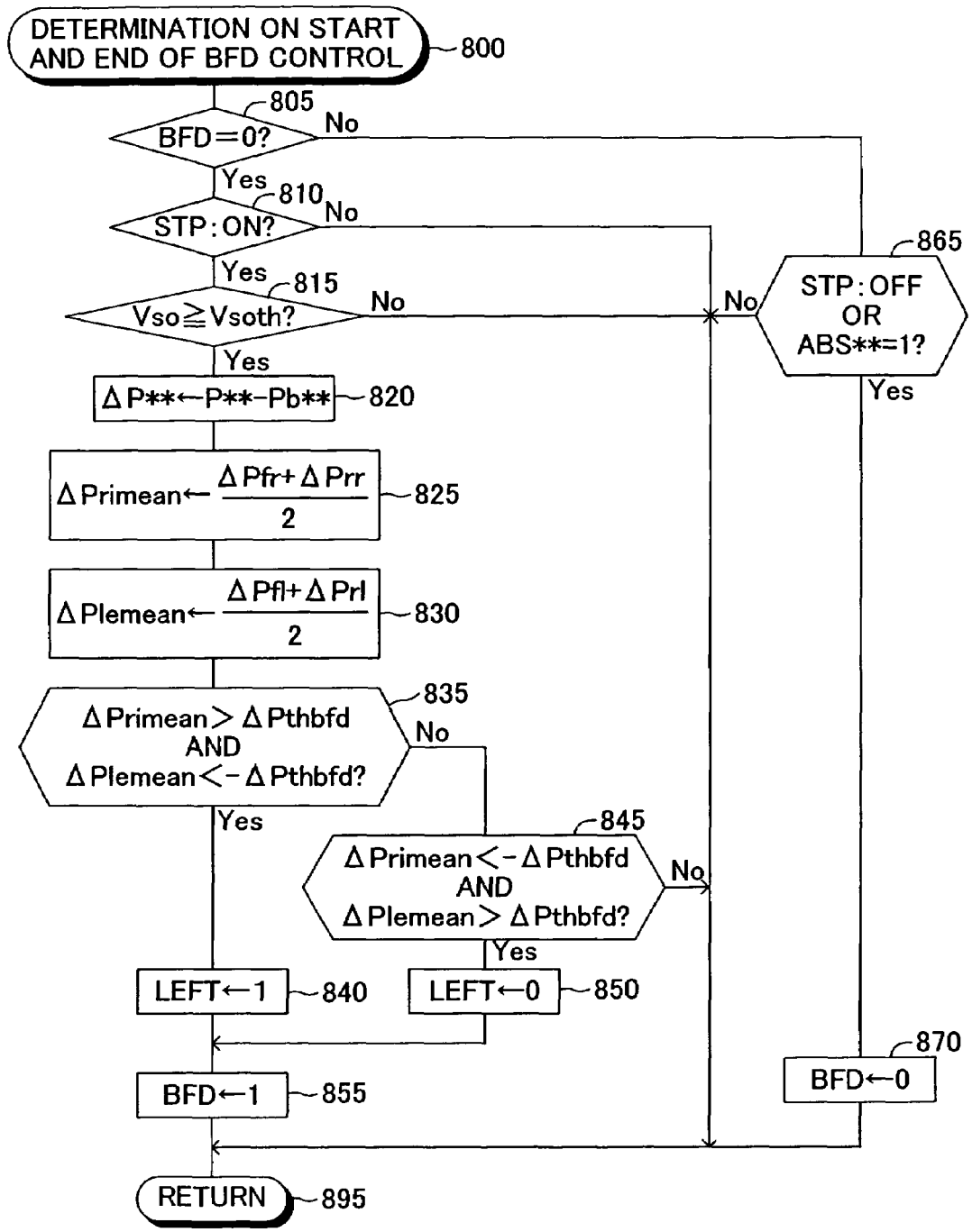
FIG. 8 is a flowchart showing a routine which the CPU shown in FIG. 1 executes in order to perform determination on start and end of BFD control.
Figure 9:
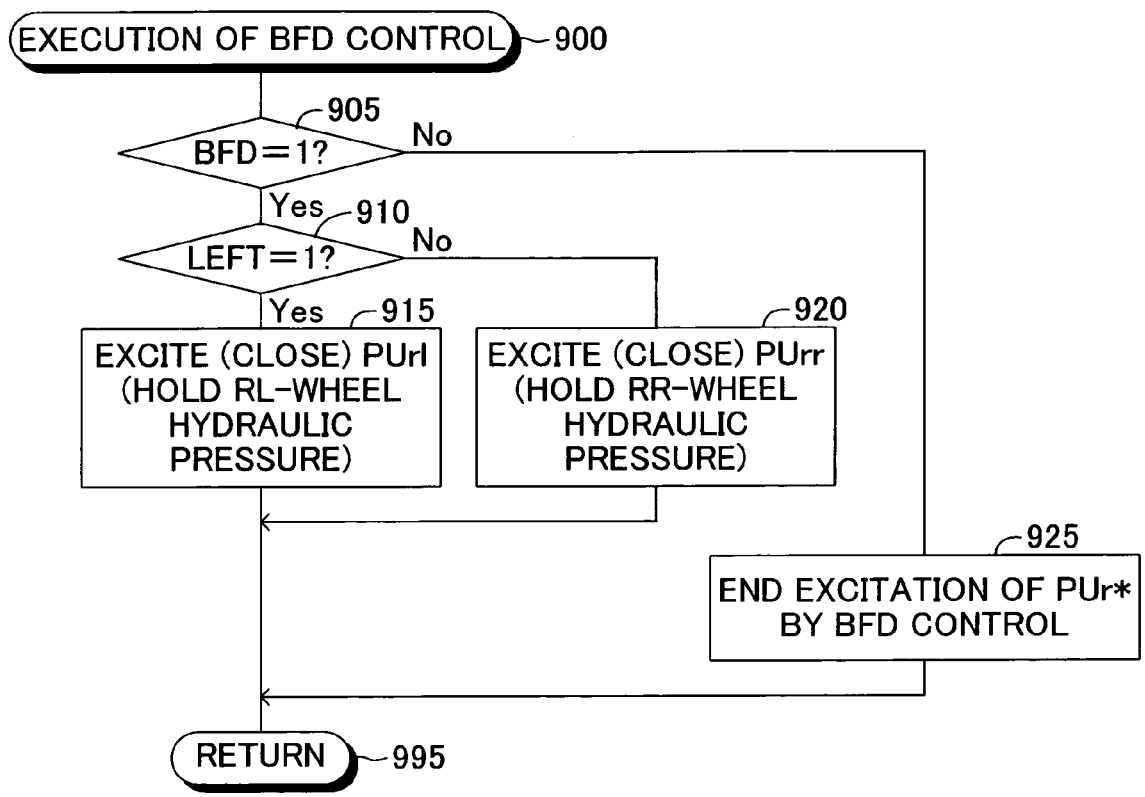
FIG. 9 is a flowchart showing a routine which the CPU shown in FIG. 1 executes in order to perform the BFD control.

In the present embodiment, the state of turning of the vehicle is estimated on the basis of changes in the tire pressures of the right-hand wheels of the vehicle (the average right-hand tire pressure change amount ΔPrimean) and changes in the tire pressures of the left-hand wheels of the vehicle (the average left-hand tire pressure change amount ΔPlemean) (see Steps 825 and 830 of FIG. 8). However, the motion state estimation apparatus may be configured to estimate the state of turning of the vehicle on the basis of a change in the tire pressure of one of the right-hand wheels of the vehicle and a change in the tire pressure of one of the left-hand wheels of the vehicle. Alternatively, the motion state estimation apparatus may be configured to estimate the state of turning of the vehicle on the basis of only one of a change in the tire pressure of one or both of the right-hand wheels of the vehicle and a change in the tire pressure of one or both of the left-hand wheels of the vehicle.

Figure 10:
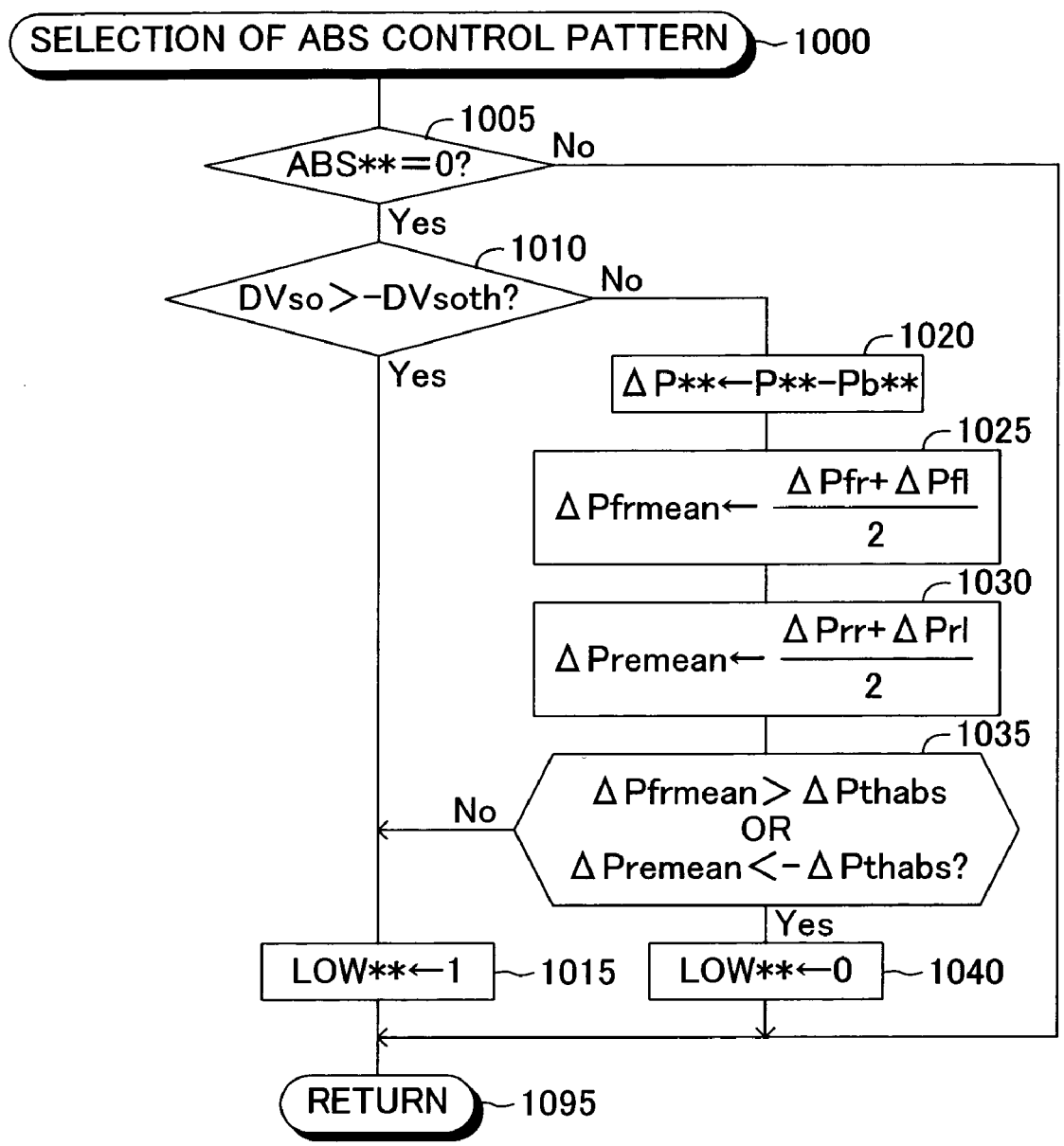
FIG. 10 is a flowchart showing a routine which the CPU shown in FIG. 1 executes in order to select an ABS control pattern.
Figure 11:
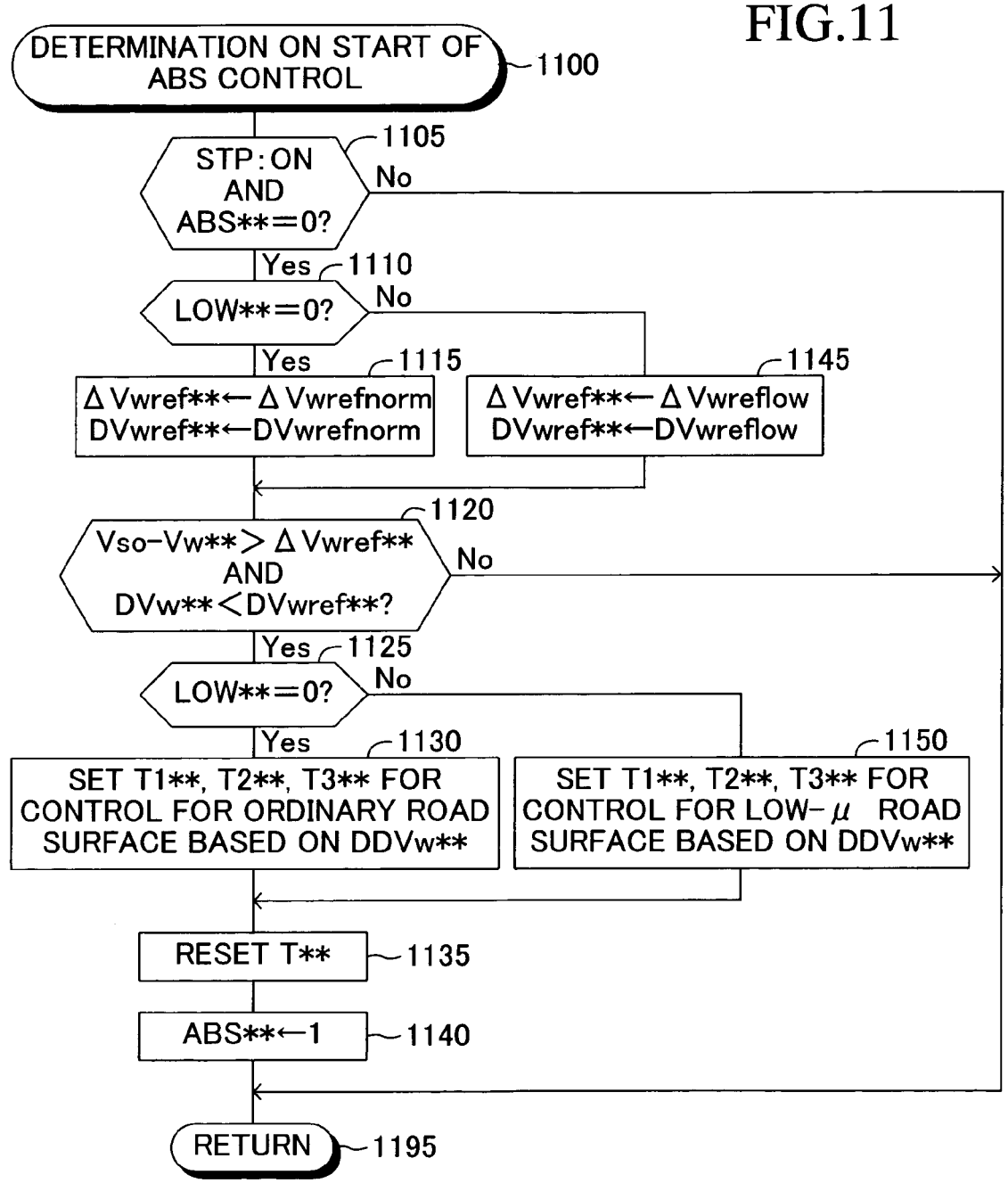
FIG. 11 is a flowchart showing a routine which the CPU shown in FIG. 1 executes in order to perform determination on start of ABS control.

In the present embodiment, the state of acceleration of the vehicle in the fore-aft direction of the vehicle body is estimated on the basis of changes in the tire pressures of the front wheels of the vehicle (the average front tire pressure change amount ΔPfrmean) and changes in the tire pressures of the rear wheels of the vehicle (the average rear tire pressure change amount ΔPremean) (see Step 1035 of FIG. 10). However, the motion state estimation apparatus may be configured to estimate the state of acceleration of the vehicle in the fore-aft direction of the vehicle body on the basis of a change in the tire pressure of one of the front wheels of the vehicle and a change in the tire pressure of one of the rear wheels of the vehicle. Alternatively, the motion state estimation apparatus may be configured to estimate the state of acceleration of the vehicle in the fore-aft direction of the vehicle body on the basis of only one of a change in the tire pressure of one or both of the front wheels of the vehicle and a change in the tire pressure of one or both of the rear wheels of the vehicle.

In the above-described embodiments, the value obtained by subtracting the previous value of each tire pressure from the present value of the tire pressure, which is obtained from the tire pressure obtaining means (tire pressure sensors **43\*\*) at predetermined intervals (at which the routine (program) is executed by the CPU 51** (e.g., 6 msec)), is used as the amount of change in the tire pressure. However, the motion state estimation apparatus may be configured to store a tire pressure at the time of start of a driver's braking operation (braking-start-time tire pressure), and use, as the amount of change in the tire pressure, the value obtained by subtracting the braking-start-time tire pressure from the tire pressure at the present point in time during the braking operation.

In the above-described embodiment, the motion state estimation apparatus is configured to perform the road surface determination for ABS control on the basis of the estimated vehicle body acceleration DVso obtained from the outputs of the wheel speed sensors (Step 1010 of FIG. 10), as well as the tire pressure change amounts ΔPfrmean and ΔPremean of the front and rear wheels of the vehicle (Step 1035 of FIG. 10). However, the motion state estimation apparatus may be configured to perform the road surface determination for ABS control on the basis of only the tire pressure change amounts ΔPfrmean and ΔPremean of the front and rear wheels of the vehicle (that is, the determination in Step 1010 may be omitted). The "No" determination in the above-described Step 1035 means that the actual vehicle body acceleration Gact (in this case, a negative value) does not become equal to or smaller than the value "−DVsoth" in a period during which the driver performs braking operation. Therefore, the "No" determination in the above-described Step 1035 is equivalent to the "Yes" determination in the above-mentioned Step 1010.

What is claimed is:

1. A motion state estimation apparatus for a vehicle, comprising:
    tire pressure obtaining means for obtaining a tire pressure of at least one wheel of the vehicle;
    acceleration obtaining means for obtaining a value representing acceleration of the vehicle on the basis of a change in the tire pressure obtained by the tire pressure obtaining means; and
    motion state estimation means for estimating a motion state of the vehicle on the basis of the value representing acceleration of the vehicle obtained by the acceleration obtaining means.

2. A motion state estimation apparatus for a vehicle according to claim 1, wherein the acceleration obtaining means is configured to obtain, as the value representing acceleration of the vehicle, a value representing fore-aft acceleration, which is a component of acceleration of the vehicle along a fore-aft direction of the vehicle body,
    wherein the motion state estimation means is configured to estimate the state of acceleration of the vehicle in the fore-aft direction of the vehicle body on the basis of the obtained value representing fore-aft acceleration.

3. A motion state estimation apparatus for a vehicle according to claim 2, wherein the acceleration obtaining means is configured to obtain the value representing fore-aft acceleration on the basis of a tire pressure of at least one front wheel of the vehicle and a tire pressure of at least one rear wheel of the vehicle obtained by the tire pressure obtaining means.

4. A motion state estimation apparatus for a vehicle according to claim 3, wherein the acceleration obtaining means is configured to obtain the value representing fore-aft acceleration on the basis of tire pressures of two front wheels of the vehicle as the tire pressure of the front wheel and tire pressures of two rear wheels of the vehicle as the tire pressure of the rear wheel obtained by the tire pressure obtaining means.

5. A motion state estimation apparatus for a vehicle according to claim 1, wherein the acceleration obtaining means is configured to obtain, as the value representing acceleration of the vehicle, a value representing lateral acceleration, which is a component of acceleration of the vehicle along a lateral direction of the vehicle body,
    wherein the motion state estimation means is configured to estimate a state of turning of the vehicle on the basis of the obtained value representing lateral acceleration.

6. A motion state estimation apparatus for a vehicle according to claim 5, wherein the acceleration obtaining means is configured to obtain the value representing lateral acceleration on the basis of a tire pressure of at least one right-hand wheel of the vehicle and a tire pressure of at least one left-hand wheel of the vehicle obtained by the tire pressure obtaining means.

7. A motion state estimation apparatus for a vehicle according to claim 6, wherein the acceleration obtaining means is configured to obtain the value representing lateral acceleration on the basis of tire pressures of front and rear right-hand wheels of the vehicle as the tire pressure of the right-hand wheel and tire pressures of front and rear left-hand wheels of the vehicle as the tire pressure of the left-hand wheel obtained by the tire pressure obtaining means.

8. A motion control apparatus for a vehicle, comprising:
    tire pressure obtaining means for obtaining a tire pressure of at least one wheel of the vehicle;

wheel speed obtaining means for obtaining a wheel speed of the wheel of the vehicle; and antiskid control means for issuing an instruction for performing antiskid control for preventing generation of excessive slippage of the wheel on the basis of at least the obtained wheel speed and the state of acceleration in the fore-aft direction of the vehicle body estimated on the basis of the obtained tire pressure by the motion state estimation means of the motion state estimation apparatus according to claim 2.

9. A motion control apparatus for a vehicle according to claim 8, wherein the antiskid control means comprises road surface determination means for determining, on the basis of at least the estimated state of acceleration in the fore-aft direction of the vehicle body, whether or not a road surface on which the vehicle is traveling is a road surface, including an icy road surface, which has a friction coefficient smaller than a predetermined friction coefficient; and the antiskid control means is configured to change the control mode of the antiskid control in accordance with the results of the determination by the road surface determination means.

10. A motion control apparatus for a vehicle comprising:

tire pressure obtaining means for obtaining a tire pressure of at least one wheel of the vehicle; and braking force distribution control means for issuing an instruction for performing braking force distribution control which imparts a difference between a braking force acting on a left-hand wheel of the vehicle and a braking force acting on a right-hand wheel of the vehicle such that a predetermined yawing moment is generated in the vehicle, on the basis of at least the state of turning of the vehicle estimated on the basis of the obtained tire pressure by the motion state estimation means of the motion state estimation apparatus according to claim 5.

11. A motion control apparatus for a vehicle, comprising:

tire pressure obtaining means for obtaining a tire pressure of at least one wheel of the vehicle;

wheel speed obtaining means for obtaining a wheel speed of the wheel of the vehicle; and antiskid control means for issuing an instruction for performing antiskid control for preventing generation of excessive slippage of the wheel on the basis of at least the obtained wheel speed and the state of acceleration in the fore-aft direction of the vehicle body estimated on the basis of the obtained tire pressure by the motion state estimation means of the motion state estimation apparatus according to claim 3.

12. A motion control apparatus for a vehicle, comprising:

tire pressure obtaining means for obtaining a tire pressure of at least one wheel of the vehicle;

wheel speed obtaining means for obtaining a wheel speed of the wheel of the vehicle; and antiskid control means for issuing an instruction for performing antiskid control for preventing generation of excessive slippage of the wheel on the basis of at least the obtained wheel speed and the state of acceleration in the fore-aft direction of the vehicle body estimated on the basis of the obtained tire pressure by the motion state estimation means of the motion state estimation apparatus according to claim 4.

13. A motion control apparatus for a vehicle comprising:

tire pressure obtaining means for obtaining a tire pressure of at least one wheel of the vehicle; and braking force distribution control means for issuing an instruction for performing braking force distribution control which imparts a difference between a braking force acting on a left-hand wheel of the vehicle and a braking force acting on a right-hand wheel of the vehicle such that a predetermined yawing moment is generated in the vehicle, on the basis of at least the state of turning of the vehicle estimated on the basis of the obtained tire pressure by the motion state estimation means of the motion state estimation apparatus according to claim 6.

14. A motion control apparatus for a vehicle comprising:

tire pressure obtaining means for obtaining a tire pressure of at least one wheel of the vehicle; and braking force distribution control means for issuing an instruction for performing braking force distribution control which imparts a difference between a braking force acting on a left-hand wheel of the vehicle and a braking force acting on a right-hand wheel of the vehicle such that a predetermined yawing moment is generated in the vehicle, on the basis of at least the state of turning of the vehicle estimated on the basis of the obtained tire pressure by the motion state estimation means of the motion state estimation apparatus according to claim 7.

15. A motion state estimation apparatus for a vehicle, comprising:

tire pressure obtaining means for obtaining tire pressures of wheels of the vehicle;

acceleration obtaining means for obtaining a value representing acceleration of the vehicle based on an increase in the tire pressure of a tire installed at a first position and a decrease in the tire pressure of a tire installed at a second position different from the first position, the acceleration being in a direction from the first position to the second position; and motion state estimation means for estimating a motion state of the vehicle based on the value representing acceleration of the vehicle obtained by the acceleration obtaining means.

* * * * *